United States Patent
Fletcher et al.

(10) Patent No.: US 12,301,010 B2
(45) Date of Patent: May 13, 2025

(54) ELECTRICAL GENERATOR SYNCHRONIZATION SYSTEM AND METHOD

(71) Applicant: NewSouth Innovations Pty Limited, Sydney (AU)

(72) Inventors: John Edward Fletcher, Sydney (AU); Cheng Tan, Sydney (AU); Jiacheng Li, Sydney (AU); Behnam Mahamedi, Sydney (AU); Quoc Anh Le, Sydney (AU)

(73) Assignee: NewSouth Innovations Party Ltd., Sydney (AU)

( * ) Notice: Subject to any disclaimer, the term of this patent is extended or adjusted under 35 U.S.C. 154(b) by 320 days.

(21) Appl. No.: 17/785,138

(22) PCT Filed: Dec. 16, 2020

(86) PCT No.: PCT/AU2020/051373
§ 371 (c)(1),
(2) Date: Jun. 14, 2022

(87) PCT Pub. No.: WO2021/119734
PCT Pub. Date: Jun. 24, 2021

(65) Prior Publication Data
US 2023/0019768 A1   Jan. 19, 2023

(30) Foreign Application Priority Data

Dec. 17, 2019   (AU) .................................. 2019904764

(51) Int. Cl.
*H02J 3/44*      (2006.01)
*G05B 19/042*    (2006.01)
(Continued)

(52) U.S. Cl.
CPC .............. *H02J 3/44* (2013.01); *G05B 19/042* (2013.01); *H02J 3/381* (2013.01);
(Continued)

(58) Field of Classification Search
None
See application file for complete search history.

(56) References Cited

U.S. PATENT DOCUMENTS

2015/0309545 A1* 10/2015 Shuey ............... H02J 13/00036
                                                          307/130
2016/0266559 A1   9/2016 Shi et al.
(Continued)

OTHER PUBLICATIONS

Meegahapola et al., "Synchronous Islanded Operation of an Inverter Interfaced Renewable Rich Microgrid Using Synchrophasors," The Institution of Engineering and Technology. IET Renewable Power Generation. 2018, vol. 12 Iss. 4, pp. 407-414.
(Continued)

*Primary Examiner* — Sean Shechtman
(74) *Attorney, Agent, or Firm* — FisherBroyles LLP; Ian R. Walsworth

(57) ABSTRACT

A system for synchronizing an electrical generator to a reference power source, the system comprising: a first measurement unit configured to: measure a magnitude and a frequency of a first electrical power at a terminal of the reference power source; record first timing data indicative of the occurrence of predetermined variations of the first electrical power at the terminal of the reference power source; and transmit the first timing data and first measurement data comprising the measured magnitude and the measured frequency of the first electrical power; a second measurement unit configured to: receive the first measurement data; measure a magnitude and a frequency of a second electrical power at a terminal of the electrical generator; and record second timing data indicative of a present time; and a
(Continued)

controller configured to adjust operational characteristics of the electrical generator based on the first timing data, the second timing data, the first measurement data, and second measurement data comprising the measured magnitude and the measured frequency of the second electrical power.

22 Claims, 21 Drawing Sheets

(51) Int. Cl.
  *H02J 3/38* (2006.01)
  *H02J 13/00* (2006.01)
(52) U.S. Cl.
  CPC ............... *H02J 13/00022* (2020.01); *G05B 2219/2639* (2013.01); *H02J 2300/20* (2020.01)

(56) References Cited

U.S. PATENT DOCUMENTS

| | | |
|---|---|---|
| 2016/0329709 A1 | 11/2016 | Park |
| 2017/0214249 A1 | 7/2017 | Seeley |
| 2017/0279280 A1 | 9/2017 | Shakeel et al. |
| 2018/0375338 A1 | 12/2018 | Manson |

OTHER PUBLICATIONS

Almas et al., "A Hybrid Synchrophasor and GOOSE-Based Power System Synchronization Scheme," IEEE Access, vol. 4, pp. 4659-4668, 2016.

D. M. Laverty et al., "Internet Based Phasor Measurement System for Phase Control of Synchronous Islands," 2008 IEEE Power and Energy Society General Meeting—Conversion and Delivery of Electrical Energy in the 21st Century, Pittsburgh, PA, USA, 2008, pp. 1-6.

M. A. Aftab et al., "IEC 61850 Communication Assisted Synchronization Strategy for Microgrids," 2018 IEEE 13th International Conference on Industrial and Information Systems (ICIIS), Rupnagar, India, 2018, pp. 401-406.

Extended European Search Report from related EP20903327. Jan. 2024. 12 pages.

Written Opinion associated with parent PCT/AU2020/051373. Mar. 1, 2021. 5 pages.

International Search Report associated with parent PCT/AU2020/051373. Mar. 1, 2021. 5 pages.

Best, R. et al, "Synchrophasor Broadcast over Internet Protocol for Distributed Generator Synchronization". IEEE Transactions On Power Delivery, 25(4), 2835-2841 (2010).

Mehmet H. Cintuglu et al, "Microgrid automation assisted by synchrophasors", 2015 IEEE Power & Energy Society Innovative Smart Grid Technologies (ISGT), Date of Conference: Feb. 18-20, 2015, p. 1-5 (2015).

Jagabondhu Hazra et al, "Stream Computing Based Synchrophasor Application For Power Grids", HiPCNA-PG'11, Proceedings of the first international workshop on High performance computing, networking and analytics for the power grid, Nov. 13, 2011, Seattle, Washington, USA, p. 43-49, (2011).

Muhammad Usama Usman et al, "Applications of Synchrophasor Technologies in Power Systems", Journal of Modern Power Systems and Clean Energy, vol. 7, Issue: 2, Mar. 2019, pp. 211-226, Mar. 2019.

* cited by examiner

FIGURE 12

| 0 | 1 | 2 | 3 | 4-7 | 8-11 | 12-15 | 16-17 | 18 |
|---|---|---|---|-----|------|-------|-------|-----|
| "[" | rev | len | Addr-A | Zrcr | Period | RMS | State | "]" |

FIGURE 13

| 0 | 1 | 2 | 3 | 4-7 | 8-11 | 12-15 | 16-19 | 20-21 | 22 |
|---|---|---|---|-----|------|-------|-------|-------|-----|
| "[" | rev | len | Addr-B | Zrcr | Period | RMS | UTC | State | "]" |

ELECTRICAL GENERATOR SYNCHRONIZATION SYSTEM AND METHOD

This application is a national stage application under 35 U.S.C. 371 and claims the benefit of PCT Application No. PCT/AU2020/051373 having an international filing date of Dec. 16, 2020, which designated the United States, and claimed the benefit of Australian Patent Application No. 2019904764, filed Dec. 17, 2019, the disclosure of each of which are incorporated by reference herein.

TECHNICAL FIELD

The present invention generally relates to the synchronization of electrical generators. In further specific examples, the present invention relates to systems and methods for synchronizing an electrical generator to a reference power source. In further specific examples, the present invention relates to systems and methods for synchronizing a microgrid to an electrical grid.

BACKGROUND

Microgrids are clusters of electrical sources and loads that can be selectively connected and disconnected from a main or centralized grid (i.e., a macrogrid). When connected to the main grid, a microgrid's power can be supplemented by power from the main grid. Alternatively, when the microgrid is disconnected from the main grid, it operates in 'islanded mode', in which the microgrid is able to generate power autonomously in order to service its local loads.

Due to their adaptable operation, microgrids facilitate the incorporation of intermittent, renewable energy sources such as solar and wind energy into the electrical grid. Moreover, a microgrid's ability to operate autonomously is useful for supplying power to remote and rural areas, where there is no guarantee of continuous connection to the main grid.

It is natural that, when a microgrid is operating in islanded mode, the power it generates drifts away (in terms of voltage amplitude and frequency) from the main grid's power. This may not be an issue while the two grids remain disconnected, but, before the microgrid can be reconnected to the main grid, it is necessary to resynchronize the microgrid's power (in terms of amplitude, frequency, and/or phase) to the power of the main grid so as to avoid dangerous overcurrents and/or overvoltages.

The resynchronization process is further complicated when the microgrid and the main grid are separated by large distances so that communication between them is subject to high latencies, as tends to be the case when the microgrid is located in a remote area.

There is a need for new or improved systems and/or methods or processes for synchronizing a microgrid or an electrical generator to a reference electrical source.

The reference in this specification to any prior publication (or information derived from the prior publication), or to any matter which is known, is not, and should not be taken as an acknowledgment or admission or any form of suggestion that the prior publication (or information derived from the prior publication) or known matter forms part of the common general knowledge in the field of endeavor to which this specification relates.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to an example aspect, there is provided a system for synchronizing an electrical generator to a reference power source, the system comprising a first measurement unit and a second measurement unit. The first measurement unit is configured to: measure a magnitude and a frequency of a first electrical power at a terminal of the reference power source; record first timing data indicative of the occurrence of predetermined variations of the first electrical power at the terminal of the reference power source; and transmit the first timing data and first measurement data comprising the measured magnitude and the measured frequency of the first electrical power. The second measurement unit configured to: receive the first measurement data; measure a magnitude and a frequency of a second electrical power at a terminal of the electrical generator; and record second timing data indicative of a present time. The system further comprises a controller configured to adjust operational characteristics of the electrical generator based on the first timing data, the second timing data, the first measurement data, and second measurement data comprising the measured magnitude and the measured frequency of the second electrical power.

In certain embodiments, the first timing data and the second timing data are recorded using a common time reference. In certain embodiments, the common time reference is a timing signal generated by a satellite system, and each of the first measurement unit and the second measurement unit comprises a satellite receiver for receiving the timing signal from the satellite system. In certain embodiments, each of the first measurement unit and the second measurement unit is connected to a wireless network, and the first measurement unit is configured to transmit the first timing data and the first measurement data to the second measurement unit through the wireless network.

In certain embodiments, the predetermined variations of the first electrical power comprise a first zero crossing and a second zero crossing of the first electrical power.

In certain embodiments, the controller is configured to adjust operational characteristics of the electrical generator by adjusting the magnitude and the frequency of the second electrical power to align with the magnitude and the frequency of the first electrical power using the first measurement data and the second measurement data. In certain embodiments, the controller is configured to adjust the magnitude and the frequency of the second electrical power by: calculating a magnitude difference between the measured magnitude of the first electrical power and the measured magnitude of the second electrical power; calculating a frequency difference between the measured frequency of the first electrical power and the measured frequency of the second electrical power; generating an adjustment electrical signal based on the calculated magnitude difference and the calculated frequency difference; and supplying the adjustment electrical signal to the terminal of the electrical generator to align the magnitude and the frequency of the second electrical power with the measured magnitude and the measured frequency of the first electrical power.

In certain embodiments, the controller is configured to adjust operational characteristics of the electrical generator by adjusting the phase of the second electrical power to align with the phase of the first electrical power using the first timing data and the second timing data. In certain embodiments, the controller is configured to adjust the phase of the second electrical power by: calculating a present phase of the first electrical power using the first timing data and the second timing data; shifting the frequency of the second electrical power from a first frequency value to a second frequency value; and returning the frequency of the second electrical power from the second frequency value to the first frequency value after a time period based on the calculated present phase of the first electrical power. In certain embodiments, the controller is configured to calculate the present phase of the first electrical power by: calculating a period of the first electrical power from the first timing data; calculating time elapsed between the present time of the second timing data and the recording of the first timing; and calculating the present phase using the calculated period and the calculated time lapsed.

In certain embodiments, the system further comprises a comparator configured to: determine whether a magnitude condition is satisfied by checking if a difference between the magnitude of the first electrical power and the magnitude of the second electrical power is less than a magnitude threshold; determine whether a frequency condition is satisfied by checking if a difference between the frequency of the first electrical power and the frequency of the second electrical power is less than a frequency threshold; determine whether a phase condition is satisfied by checking if a difference between the phase of the first electrical power and the phase of the second electrical power is less than a phase threshold; and if the magnitude condition, the frequency condition, and the phase condition are satisfied for a predetermined time, controlling one or more switches to establish an electrical connection between the terminal of the electrical generator and the terminal of the reference power source.

In certain embodiments, the first measurement unit comprises a processing system configured to measure the magnitude of the first electrical power by performing a fast Fourier transform of the first electrical power. In certain embodiments, the second measurement unit comprises a processing system configured to measure the magnitude of the second electrical power by performing a fast Fourier transform of the second electrical power.

In certain embodiments, the first measurement unit comprises a phase-locked loop configured to measure the frequency of the first electrical power. In certain embodiments, the second measurement unit comprises a phase-locked loop configured to measure the frequency of the second electrical power.

In certain embodiments, the electrical generator is a grid-forming inverter of a microgrid, and the reference power source is an electrical grid.

According to another example aspect, there is provided a method for synchronizing an electrical generator to an reference power source. The method comprises: measuring, by a first measurement unit, a magnitude and a frequency of a first electrical power at a terminal of the reference power source; recording, by the first measurement unit, first timing data indicative of the occurrence of predetermined variations of the first electrical power at the terminal of the reference power source; transmitting the first timing data and first measurement data comprising the measured magnitude and the measured frequency of the first electrical power from the first measurement unit to a second measurement unit; measuring, by the second measurement unit after receiving the first timing data and the first measurement data, a magnitude and a frequency of a second electrical power at a terminal of the electrical generator; recording, by the second measurement unit, second timing data indicative of a present time; and adjusting operational characteristics of the electrical generator based on the first timing data, the second timing data, the first measurement data, and second measurement data comprising the measured magnitude and the measured frequency of the second electrical power.

In certain embodiments, the first timing data and the second timing data are recorded using a common time reference. In certain embodiments, the common time reference is a timing signal generated by a satellite system. In certain embodiments, the first timing data and the first measurement data are transmitted from the first measurement unit to the second measurement unit through a wireless network.

In certain embodiments, the predetermined variations of the first electrical power comprise a first zero crossing and a second zero crossing of the first electrical power.

In certain embodiments, adjusting operational characteristics of the electrical generator comprises: adjusting a present magnitude and a present frequency of the second electrical power based on the first measurement data and the second measurement data to align the present magnitude and the present frequency of the second electrical power with the measured magnitude and the measured frequency of the first electrical power; and then, adjusting a present phase of the second electrical power to align the present phase of the second electrical power with a present phase of the first electrical power calculated using the first timing data and the second timing data.

In certain embodiments, adjusting the present magnitude and the present frequency of the second electrical power comprises: calculating a magnitude difference between the measured magnitude of the first electrical power and the measured magnitude of the second electrical power; calculating a frequency difference between the measured frequency of the first electrical power and the measured frequency of the second electrical power; generating an adjustment electrical signal based on the calculated magnitude difference and the calculated frequency difference; and supplying the adjustment electrical signal to the terminal of the electrical generator to align the present magnitude and the present frequency of the second electrical power with the measured magnitude and the measured frequency of the first electrical power.

In certain embodiments, adjusting the present phase of the second electrical power comprises: calculating the present phase of the first electrical power using the first timing data and the second timing data; shifting the frequency of the second electrical power from a first frequency value to a second frequency value; and returning the frequency of the second electrical power from the second frequency value to the first frequency value after a time period based on the calculated present phase of the first electrical power. In certain embodiments, calculating the present phase of the first electrical power comprises: calculating a period of the first electrical power from the first timing data; calculating time lapsed between the present time of the second timing data and the recording of the first timing; and calculating the present phase using the calculated period and the calculated time lapsed.

In certain embodiments, the method further comprises: updating, by the first measurement unit and by the second measurement unit, measurements of the magnitude, frequency, and phase of the first electrical power and of the second electrical power; determining whether a magnitude condition is satisfied by checking if a difference between the measured magnitude of the first electrical power and the measured magnitude of the second electrical power is less than a magnitude threshold; determine whether a frequency condition is satisfied by checking if a difference between the measured frequency of the first electrical power and the frequency of the second electrical power is less than a frequency threshold; determine whether a phase condition is satisfied by checking if a difference between the measured phase of the first electrical power and the measured phase of the second electrical power is less than a phase threshold; and if the magnitude condition, the frequency condition, and the phase condition are satisfied for a predetermined time, controlling one or more switches to establish an electrical connection between the terminal of the electrical generator and the terminal of the reference power source.

In certain embodiments, measuring the magnitude of the first electrical power comprises performing a fast Fourier transform of the first electrical power. In certain embodiments, measuring the magnitude of the second electrical power comprises performing a fast Fourier transform of the second electrical power.

In certain embodiments, the electrical generator is a grid-forming inverter of a microgrid, and the reference power source is an electrical grid.

Other aspects, features, and advantages will become apparent from the following Detailed Description when taken in conjunction with the accompanying drawings, which are a part of this disclosure and which illustrate, by way of example, principles of the various embodiments.

BRIEF DESCRIPTION OF FIGURES

Example embodiments are apparent from the following description, which is given by way of example only, of at least one non-limiting embodiment, described in connection with the accompanying figures.

FIG. 12 illustrates an example format of data sent from the first electrical enclosure to the second electrical enclosure of FIG. 11.

FIG. 13 illustrates an example format of data sent from the second electrical enclosure to a microgrid controller of the system of FIG. 11.

DETAILED DESCRIPTION

Figure 1:
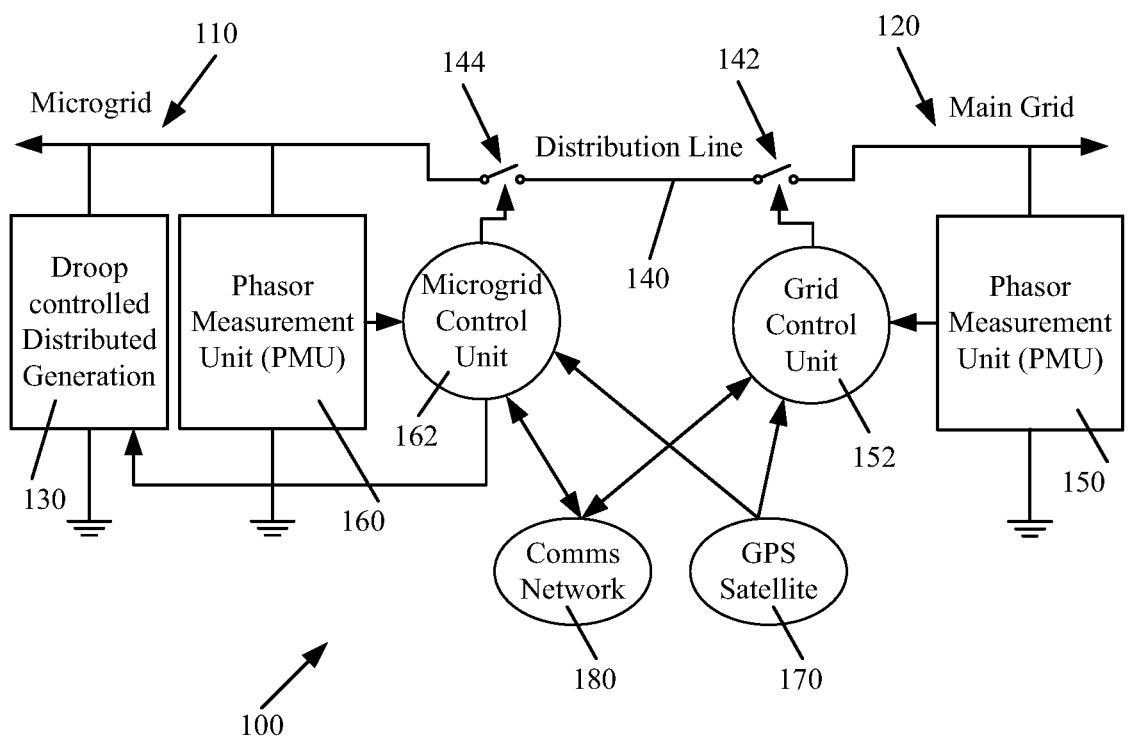
FIG. 1 illustrates a block schematic of an example system for synchronizing an electrical generator to a reference power source.

The following modes, given by way of example only, are described in order to provide a more precise understanding of the subject matter of an embodiment or embodiments. In the figures, incorporated to illustrate features of an example embodiment, like reference numerals are used to identify like parts throughout the figures.

Referring to FIG. 1, there is illustrated an example system 100 for synchronizing a microgrid 110 to an electrical grid 120. Microgrid 110 and electrical grid 120 may be located remotely of each other. In some examples, microgrid 110 and electrical grid 120 are separated by a distance of tens or hundreds of kilometers.

Microgrid 110 comprises an electrical generator 130. More generally, microgrid 110 may comprise one or more electrical generators, one or more electrical loads, and/or one or more electrical energy storage elements (not shown). In some examples, electrical generator 130 outputs sufficient power to effectively set the voltage and frequency of microgrid 110 as a whole. Therefore, electrical generator 130 may be the 'master', dominant, or principal generator of microgrid 110. In some examples, electrical generator 130 is a grid-forming inverter configured to form or regulate microgrid 110 by interfacing with different DC or variable AC power sources (such as renewable sources). Electrical grid 120 may be a main or centralized grid, acting as a host power system to microgrid 110 and electrical generator 130.

In some examples, electrical generator 130 is a distributed generation system configured to convert a renewable energy source such as solar power, wind power, geothermal power or any other source of energy into electrical energy. Consequently, electrical generator 130 may comprise one or more photovoltaic cells, wind turbines, or any other renewable energy harnessing device, or a combination of such devices, as well as one or more electrical energy storage elements. In other examples, electrical generator 130 is any other type of electrical generator configured to convert a renewable or non-renewable energy source into electrical energy (e.g., a diesel generator).

An electrical cable 140 is configured to interconnect microgrid 110 to electrical grid 120 and to allow for electrical energy transfer between microgrid 110 and electrical grid 120. In some examples, cable 140 is a single electrical conductor, such as a single-wire transmission line, a single-wire earth return (SWER), or any other single distribution feeder operatively coupling microgrid 110 and electrical grid 120. In other examples, cable 140 comprises one or more conductors. In some examples, cable 140 is a transmission line or a distribution line.

A first switch 142 is provided on a grid-side of electrical cable 140, in proximity of electrical grid 120, for selectively connecting a coupling point, terminal, or node, of electrical grid 120 to cable 140. Similarly, a second switch 144 is provided on a microgrid-side of electrical cable 140, in proximity of microgrid 110, for selectively connecting a coupling point, terminal, or node, of microgrid 110 to cable 140. Each of switches 142 and 144 may be a static transfer switch configured to instantaneously transfer power across its terminals, a circuit breaker, or any other type of electrical switch.

When either one or both switches 142 and 144 are open (e.g. as might be necessary during a fault), microgrid 110 is disconnected from electrical grid 120 and operates in islanded mode whereby microgrid 110 autonomously generates and supplies electrical energy to power the loads connected to it. In islanded mode, the voltage and frequency output by microgrid 110 is controlled by the microgrid itself and the power output of its electrical sources (including electrical generator 130) must match the power requirements of all the connected loads.

When both switches 142 and 144 are closed, microgrid 110 is connected to electrical grid 120 and operates in 'grid-connected' or 'grid-tied' mode whereby microgrid 110 is configured to receive and/or supply electrical energy to electrical grid 120. In grid-connected mode, the voltage and frequency output by microgrid 110 is controlled by electrical grid 120.

System 100 further comprises phasor measurement units 150 and 160. Phasor measurement unit 150 is configured to perform a first measurement of electrical power at the coupling point of electrical grid 120, while phasor measurement unit 160 is configured to perform a second measurement of electrical power at the coupling point of microgrid 110. A coupling point may be a node providing a point of connection to microgrid 110 or to electrical grid 120. The coupling point of microgrid 110 may be configured to connect, or operatively connect, to the coupling point of electrical grid 120, through cable 140.

Each phasor measurement unit 150 and 160 is configured to measure characteristics of the electrical power waveform. The measured characteristics may comprise an amplitude (e.g., a voltage amplitude), a phase, and a frequency of the electrical power waveform. In some examples, the measured characteristics comprise a synchrophasor.

The first and second measurements may occur with reference to a timing signal, such as a timing signal generated by the Global Positioning System (GPS) 170 or by another satellite or navigation system.

For example, the GPS comprises a constellation of satellites, each satellite emitting signals containing time codes. While typically used for localization purposes, the time codes provided by each satellite can also be used to synchronize clocks. In some examples, the timing signals emitted by each satellite enable synchronization with an accuracy within one microsecond, which corresponds to a margin of 0.018 degrees for a 50 Hz signal, or 0.022 degrees for a 60 Hz signal, which are typical AC frequencies. Therefore, the timing signals transmitted by the GPS may be used for synchronizing two different power waveforms within an acceptable margin of error.

System 100 further comprises a control system 152 operatively coupled to the phasor measurement unit 150, and a control system 162 operatively coupled to phasor measurement unit 160. Control systems 152 and 162 may be configured to receive the timing signal and, in response to receiving the timing signal, operate the respective phasor measurement units 150 and 160 to perform the first and second measurements.

Phasor measurement unit 150 and control system 152 may be located in proximity to electrical grid 120, while phasor measurement unit 160 and control system 162 may be located in proximity to microgrid 110 and electrical generator 130. Phasor measurement unit 150 and control system 152 may be separated by a cable and by a geographical distance from phasor measurement unit 160 and control system 162.

Control system 152 may further be configured to transmit data indicative of at least the first measurement from phasor measurement unit 150 through a communication network 180 to control system 162. In some examples, communication network 180 is a wireless communication network such as a satellite network, a radio network, a microwave network, or a LoRa (Long Range) network. In other examples, the communication network is a wired communication network, such as a fiber optic network.

A wireless communication network may be advantageous in situations in which there is no reliable terrestrial communication link or infrastructure between microgrid 110 and electrical grid 120. For example, satellite communication is widely accessible around the planet and LoRa enables communication across kilometer-ranges with low power consumption.

Control system 162 may be configured to receive the data from phasor measurement unit 150 through wireless communication network 180.

Control system 162 may further be configured to adjust operational characteristics of electrical generator 130 based on the data from the first phasor measurement unit 150 and the second measurement.

In some examples, control system 162 implements PQ and VF control, in which distributed generators of microgrid 110 operate in PQ mode when microgrid 110 is in grid-connected mode. When islanding occurs, electrical generator 130 (being a master inverter) switches to VF control in order to control the microgrid's voltage and frequency. A control loop implemented by control system 162 then matches voltage, frequency, and phase with electrical grid 120 before reconnection occurs.

In some examples, control system 162 implements droop control. When islanding occurs, droop control allows the inverters of microgrid 110 to adjust power output to match the load, but this will cause the voltage and frequency to change according to the inverter's droop characteristic. The reference voltage and frequency are adjusted in a control loop to bring the actual voltage and frequency back to nominal values.

In some examples, system 100 offers two different synchronization procedures having different optimization outcomes: minimizing the time to resynchronize or minimizing the energy required to resynchronize.

In some examples, microgrid 110 has sources and loads. In some examples, some loads are rotational, some sources are storage elements. In order to resynchronize, the phase and frequency of the microgrid 110 may be pushed or pulled towards those of the main grid 120.

Following synchronization, control system 152 may be further configured to operate first switch 142 and control system 162 may be further configured to operate second switch 144 to form an electrical connection between the coupling points of electrical grid 120 and the coupling point of microgrid 110 by closing switches 142 and 144.

Control systems 152 and 162 may be configured to operate switch 142 and 144 synchronously.

Figure 2:
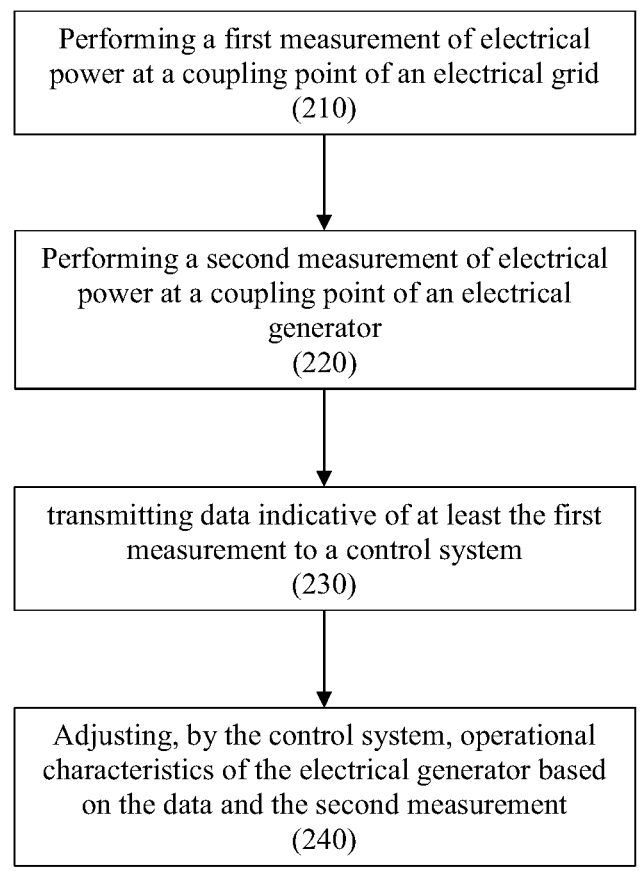
FIG. 2 illustrates an example method of synchronizing an electrical generator to a reference power source.

Referring to FIG. 2, there is illustrated an example method 200 for synchronizing an electrical generator to an electrical grid located remotely of the electrical generator. Method 200 comprises a step 210 of performing a first measurement of electrical power at a coupling point of the electrical grid. Method 200 further comprises a step 220 of performing a second measurement of electrical power at a coupling point of the electrical generator. In some examples, the first measurement and the second measurement comprise time information (e.g. a timestamp) obtained from a timing signal generated by a satellite system. Method 200 further comprises a step 230 of transmitting data indicative of at least the first measurement to a control system. The data may be transmitted through a wireless communication network. Method 200 further comprises a step 240 of adjusting, by the control system, operational characteristics of the electrical generator based on the data and the second measurement.

Figure 3:
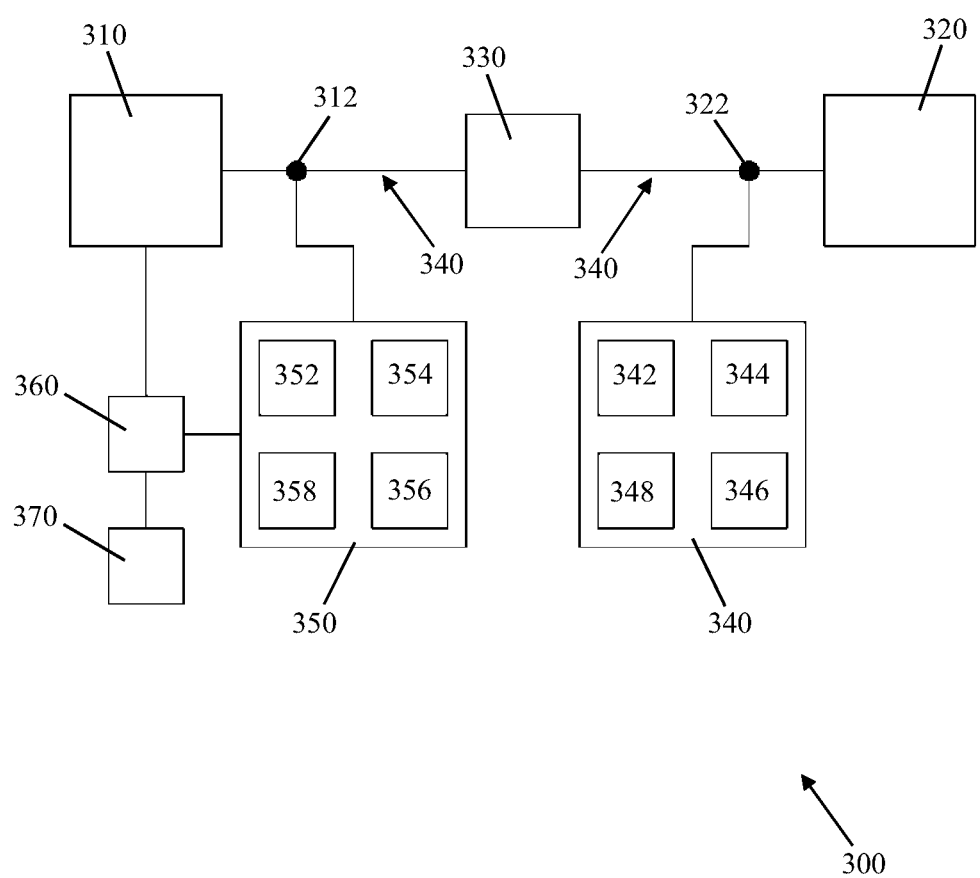
FIG. 3 illustrates a block schematic of another example system for synchronizing an electrical generator to a reference power source.

Referring to FIG. 3, there is illustrated another example system 300 for synchronizing an electrical generator 310 to a reference power source 320.

In some examples, electrical generator 310 is an electrical generator of a microgrid. In some examples, electrical generator 310 is a grid-forming inverter or a master inverter of a microgrid. In some examples, reference power source 320 is an electrical grid. In some examples, reference power source 320 is another electrical generator.

Electrical generator 310 and reference power source 320 may be selectively connectable to each other through one or more switches 330, which selectively establish or break an electrical connection between a terminal 312 of electrical generator 310 and a terminal 322 of reference power source 320. Electrical generator 310 may be located remotely from reference power source 320, so that one or more cables 340 may span a distance between electrical generator 310 and reference power source 320 and may be selectively connected to terminals 312 and 322 (through one or more switches 330). In some examples, electrical generator 310 and reference power source 320 are electrically isolated or independent from each other (i.e. they are not electrically connected) prior to synchronization.

System 300 comprises a first measurement unit 340. In some examples, first measurement unit 340 is operatively coupled to reference power source 320 in order to measure characteristics of the electrical power produced by reference power source 320. Therefore, in some examples, first measurement unit 340 is located in proximity to reference power source 320 or terminal 322.

First measurement unit 340 is configured to measure a magnitude and a frequency of a first electrical power at terminal 322. The magnitude of the first electrical power may be a measure of the amount of electrical power, such as a measure of voltage, a measure of current, a peak value, a peak-to-peak value, or a root mean square value. The frequency of the first electrical power may be a fundamental frequency of the electrical power.

In some examples, first measurement unit 340 comprises a processing system 342 configured to measure the magnitude of the first electrical power by performing a fast Fourier transform of the first electrical power (or of a waveform representing the first electrical power measured by first measurement unit 340). In some examples, first measurement unit 340 comprises a phase-locked loop 344 configured to measure the frequency of the first electrical power.

First measurement unit 340 is further configured to record first timing data indicative of the occurrence of predetermined variations, events, or features of the first electrical power at terminal 322. In some examples, the predetermined variations of the first electrical power comprise a first zero crossing and a second zero crossing of the first electrical power, or of a fundamental waveform (e.g. a sinusoid) of the first electrical power. The first zero crossing and the second zero crossing may be consecutive (i.e. a rising zero crossing and a falling zero crossing separated by half of the period of the waveform) or non-consecutive (i.e. separated by an integer-multiple of half of the period of the waveform). In other examples, the predetermined variations may comprise a crest, a trough, or any other feature of the waveform, such as a specific slope of the waveform.

First measurement unit 340 is further configured to transmit the first timing data and first measurement data comprising the measured magnitude and the measured frequency of the first electrical power.

System 300 further comprises a second measurement unit 350. In some examples, second measurement unit 350 is operatively coupled to electrical generator 310 in order to measure characteristics of the electrical power produced by electrical generator 310. Therefore, in some examples, second measurement unit 350 is located in proximity to electrical generator 310 or terminal 312.

Second measurement unit 350 is configured to receive the first measurement data from first measurement unit 340.

In some examples, first measurement unit 340 and second measurement unit 350 are both connected to a wireless network, or they are interconnected through a wireless communication link. First measurement unit 340 may then be configured to transmit the first timing data and the first measurement data to second measurement unit 350 through the wireless network or wireless link. Therefore, in some examples, first measurement unit 340 and second measurement unit 350 each comprises a communication unit 348 and 358, respectively, for transmitting and receiving data (such as measurement data and timing data) between first measurement unit 340 and second measurement unit 350.

Second measurement unit 350 is further configured to measure a magnitude and a frequency of a second electrical power at terminal 312. The magnitude of the second electrical power may be a measure of the amount of electrical power, such as a measure of voltage, a measure of current, a peak value, a peak-to-peak value, or a root mean square value. The frequency of the second electrical power may be a fundamental frequency of the electrical power.

In some examples, second measurement unit 350 comprises a processing system 352 configured to measure the magnitude of the second electrical power by performing a fast Fourier transform of the second electrical power (or of a waveform representing the second electrical power measured by second measurement unit 350). In some examples, second measurement unit 350 comprises a phase-locked loop 354 configured to measure the frequency of the second electrical power.

Second measurement unit 350 is further configured to record second timing data indicative of a present (or current) time. Second measurement unit 350 may be configured to record the second timing data after receiving the first measurement data and after measuring the magnitude and frequency of the second electrical power.

In some examples, the first timing data and the second timing data are recorded using a common time reference or a common timing (or counter) signal, such as coordinated universal time (UTC). In some examples, the common time reference or timing signal is generated by a satellite system, such as the GPS. Therefore, in some examples, first measurement unit 340 and second measurement unit 350 each comprises a satellite receiver 346 and 356, respectively, for receiving the common timing signal from the satellite system.

System 300 further comprises a controller 360. In some examples, controller 360 is operatively coupled to electrical generator 310 in order to supply or feed an electrical power to electrical generator 310. Therefore, in some examples, controller 360 is located in proximity to electrical generator 310 or terminal 312.

In some examples, controller 360 is configured to receive from second measurement unit 350 the first timing data, the second timing data, the first measurement data, and second measurement data comprising the measured magnitude and the measured frequency of the second electrical power. Therefore, controller 360 may be operatively coupled to, or in communication with, second measurement unit 350.

Controller 360 is further configured to adjust operational characteristics of electrical generator 310 based on the first timing data, the second timing data, the first measurement data, and the second measurement data.

In some examples, controller 360 is configured to adjust operational characteristics of electrical generator 310 by adjusting the magnitude and the frequency of the second electrical power to align with the magnitude and the frequency of the first electrical power using the first measurement data and the second measurement data.

In some examples, controller 360 is configured to calculate a magnitude difference and a frequency difference. The magnitude difference may be the difference between the measured magnitude of the first electrical power and the measured magnitude of the second electrical power. The frequency difference may be the difference between the measured frequency of the first electrical power and the measured frequency of the second electrical power. Controller 360 is further configured to generate an adjustment electrical signal based on the calculated magnitude difference and the calculated frequency difference. Controller 360 is further configured to supply the adjustment electrical signal to terminal 312 to align the magnitude and the frequency of the second electrical power with the measured magnitude and the measured frequency of the first electrical power, as indicated by the first measurement data.

In some examples, controller 360 is configured to adjust operational characteristics of electrical generator 310 by adjusting the phase of the second electrical power to align with the phase of the first electrical power using the first timing data and the second timing data.

In some examples, controller 360 is configured to calculate a present (or current) phase of the first electrical power using the first timing data and the second timing data. Controller 360 is further configured to shift the frequency of the second electrical power from a first frequency value to a second frequency value. Controller 360 is further configured to return the frequency of the second electrical power from the second frequency value to the first frequency value after a time period based on the calculated present phase of the first electrical power.

In some examples, controller 360 is configured to calculate a period of the first electrical power from the first timing data. Controller 360 is further configured to calculate an amount of time elapsed between the present time of the second timing data and the recording of the first timing. The time lapsed may account for latency of communication between first measurement unit 340 and second measurement unit 350. Controller 360 is further configured to calculate the present phase using the calculated period and the calculated time lapsed. Calculating the present phase may comprise performing a modulus operation to calculate the remainder of a division of the time lapsed by the period. The present phase may then be provided by converting the remainder into radians (and adding or subtracting any predetermined phase amount to account for known, fixed delays or sine-cosine conversion).

System 300 further comprises a comparator 370 configured to monitor electrical characteristics of the first electrical power and the second electrical power to determine if electrical generator 310 and electrical grid 320 are synchronized. In some examples, electrical generator 310 and electrical grid 320 are deemed to be synchronized when the magnitudes, frequencies, and phases of the first electrical power and the second electrical power are equal or otherwise differ by amounts that are considered appropriate for synchronization.

In some examples, comparator 370 is configured to determine whether a magnitude condition, a frequency condition, and a phase condition are satisfied. The magnitude condition is satisfied when a difference between the magnitude of the first electrical power and the magnitude of the second electrical power is less than a magnitude threshold. The frequency condition is satisfied when a difference between the frequency of the first electrical power and the frequency of the second electrical power is less than a frequency threshold. The phase condition is satisfied when a difference between the phase of the first electrical power and the phase of the second electrical power is less than a phase threshold. If the magnitude condition, the frequency condition, and the phase condition are simultaneously satisfied for a predetermined time, comparator 370 may further be configured to control one or more switches 330 to establish an electrical connection between the terminal of the electrical generator and the terminal of the electrical grid.

Figure 4:
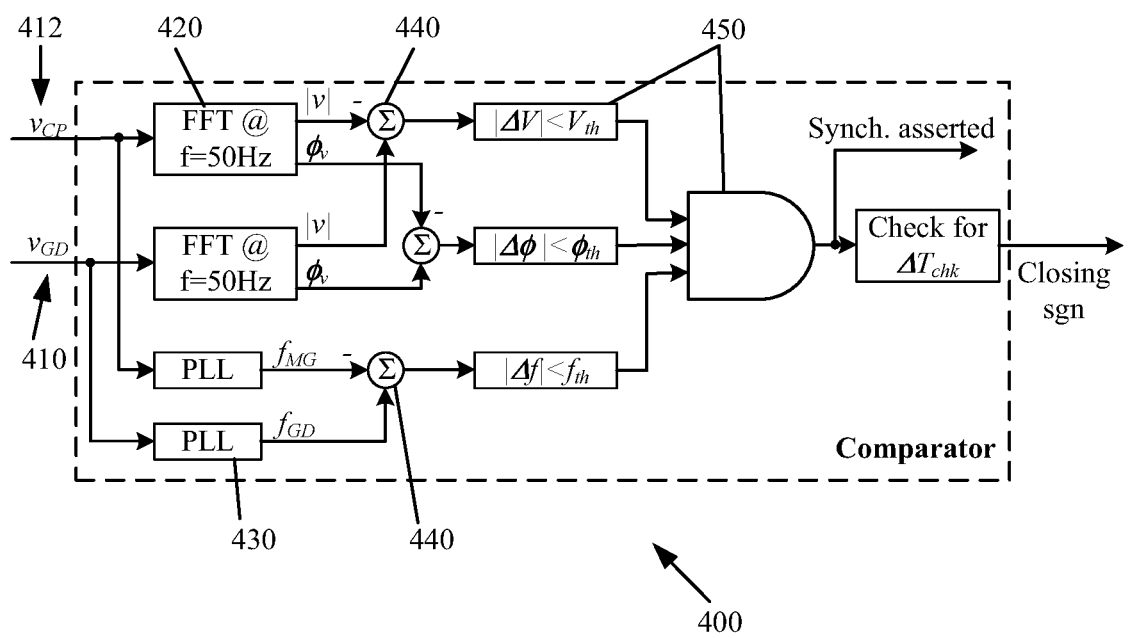
FIG. 4 illustrates a block schematic of an example comparator of the system of FIG. 3.

Referring to FIG. 4, there is illustrated a block diagram of an example comparator 400 suitable for use in a synchronization system, such as system 300. Comparator 400 is configured to receive a measurement of a first electrical power 410 and a second electrical power 412. Comparator 400 comprises one or more processing systems 420 configured to calculate a magnitude and a phase by performing a fast Fourier transform of the first electrical power 410 and of the second electrical power 412. Comparator 400 further comprises phase-locked loops 430 configured to measure a frequency of the first electrical power 410 and of the second electrical power 420. Comparator 400 further comprises summers 440 configured to calculate a difference between the calculated magnitudes, frequencies, and phases. Comparator 440 further comprises logic circuits 450 configured to determine if the calculated differences are less than predetermined thresholds and to generate a control signal to close a switch to establish an electrical connection between an electrical generator and a reference power source.

Second electrical power 412 comprises a voltage $V_{CP}$ (i.e. voltage at connection point) that may be measured at the microgrid-side of a switch or circuit breaker. This voltage is input to a phase-locked loop 430 that generates the frequency of the fundamental component, $f_{MG}$. $V_{CP}$ is further input into a fast Fourier transform computing device 420, which generates the magnitude of the fundamental voltage and the phase. These values are similarly calculated for voltage $V_{GD}$ of first electrical power 410, which may be measured at the main grid-side of a switch or circuit breaker. The errors or discrepancies between each of these values (magnitude, phase, and frequency) of $V_{GD}$ and $V_{CP}$ are compared and, if each of the error magnitudes meets a threshold condition for a preset or predetermined time ($\Delta T_{chk}$), then the switch closing signal ('Closing sgn') is generated. The preset time may be set by the user according to the estimated latency in the communication path between the microgrid and the main grid, plus a time that represents the required stable operation time of the main grid. This time represents the confidence in the stability of the grid that is required to be met before the switch is closed. If the microgrid exceeds any of the thresholds, then a timer is reset and the resynchronization process is re-started.

Figure 5:
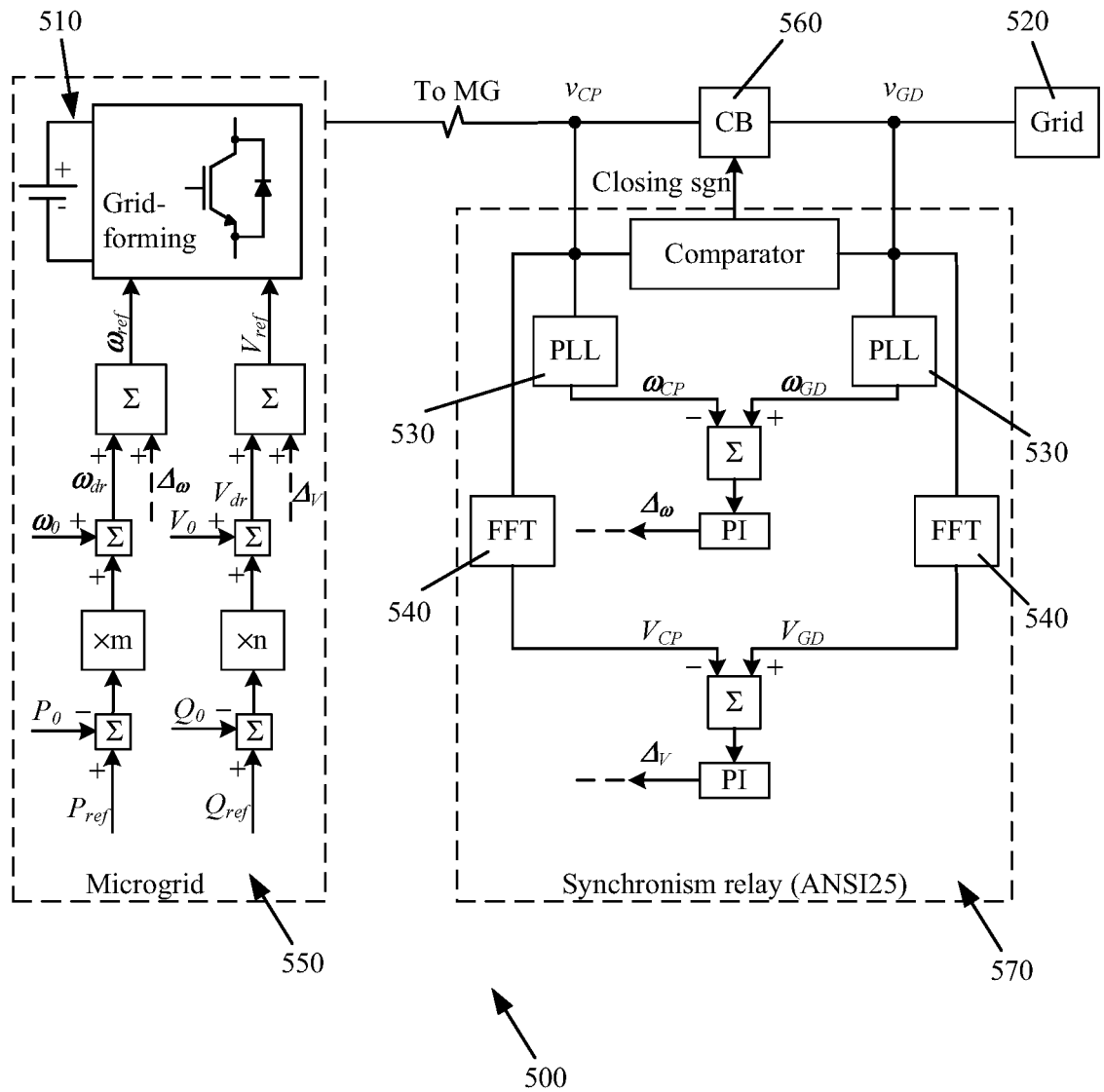
FIG. 5 illustrates a block schematic of another example system for synchronizing an electrical generator to a reference power source.

Referring to FIG. 5, there is illustrated a block diagram of another example system 500 for synchronizing the voltage and frequency of a grid-forming inverter of a microgrid 510 to those of a reference power source in the form of an electrical grid 520. Phase-locked loops (PLL) 530 are used to track the frequencies of the grid 520 and microgrid 510. Fast Fourier Transforms (FFT) 540 are used to estimate the amplitude of the fundamental voltage at the grid 520 and at the microgrid 510. These blocks are used to determine how to change the voltage and frequency of the microgrid 510 using a microgrid controller 550 and bring the microgrid 510 back into synchronism with the main grid 520 so that a breaker 560 can be closed (or reclosed) to reconnect the two grids together. Voltage ($\Delta V$) and frequency ($\Delta \omega$) change commands are generated by the synchronization unit 570 and are transferred to the microgrid controller 550, where they are integrated within the grid-forming source of microgrid 510. Proportional and integral controllers are used in a feedback loop to adjust the microgrid voltage and frequency back to those of the grid.

Figure 6:
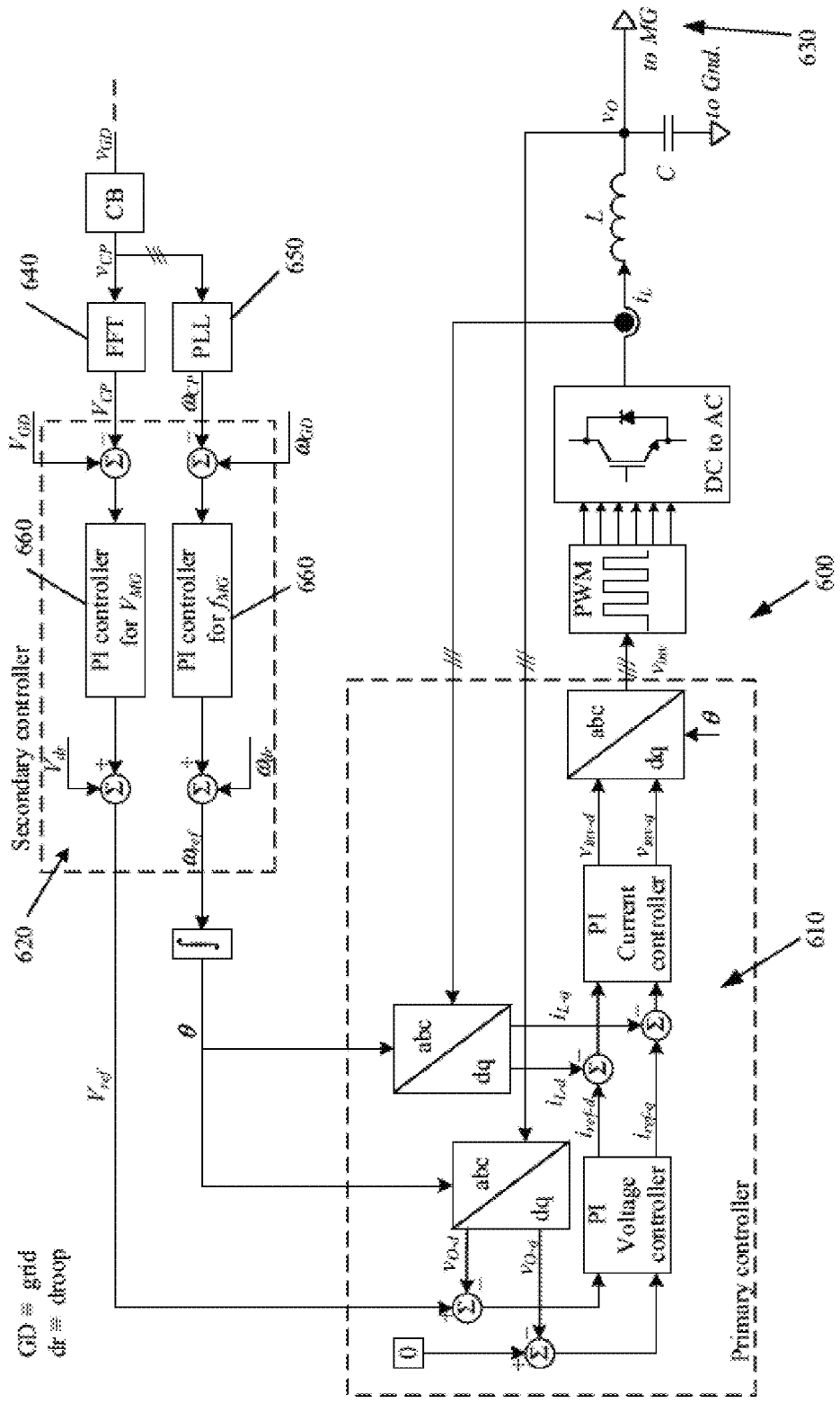
FIG. 6 illustrates a block schematic of an example control system for controlling an electrical generator during a synchronization process.

Referring to FIG. 6, there is illustrated a block diagram of an example control system 600. Control system 600 comprises primary controllers 610 and secondary controllers 620. Controllers 610 and 620 may be placed around a grid-forming inverter of a microgrid 630. The primary controllers 610 are configured to adjust the output voltage of the inverter in order to regulate the output voltage at the filter output of the inverter to setpoint values issued by the secondary controllers 620. The secondary controllers 620 are configured to act on the calculated grid voltage and frequency requirements which include the change required in time for the microgrid voltage to be brought back into synchronism with the main grid. By using this system of nested feedback control loops, the microgrid voltage can be stably brought back into synchronism with the main grid.

Inverter voltage $V_{CP}$ (corresponding to the electrical power of microgrid 630) is input to a fast Fourier transform computing device 640 to generate the magnitude of the fundamental voltage. Inverter voltage $V_{CP}$ is further input to a phase-locked loop 650 to generate the angular frequency of the fundamental voltage. These values are then compared with the equivalent values from a reference voltage $V_{GD}$ (e.g., corresponding to the electrical power of a main grid) by secondary controllers 620. $V_{GD}$ may be obtained from measurements of the power of a main grid and communicated through a long-latency communication channel to control system 600.

Two error amplifiers determine the error or difference between the fundamental voltage amplitude and the angular frequency of $V_{CP}$ and $V_{GD}$. These two errors are input to two proportional and integral (PI) controllers 660 that generate references $V_{MG}$ and $\omega_{MG}$ that are then compensated by droop values, $V_{dr}$ and $\omega_{dr}$, to give the target references $V_{ref}$ and $\theta$, which is the integral of $\omega_{ref}$.

The values of $V_{ref}$ and $\theta$ which are output from secondary controllers 620 are then input to a standard primary controller 610, which in this case is in the rotating dq reference frame. Primary controller 610 regulates the output voltage, $v_O$, and its frequency to match the input values, $V_{ref}$ and $\omega_{ref}$. Primary controller 610 is coupled to the grid-forming inverter of microgrid 630 such that output voltage $v_O$ sets or drives the output voltage of the inverter.

Figure 7:
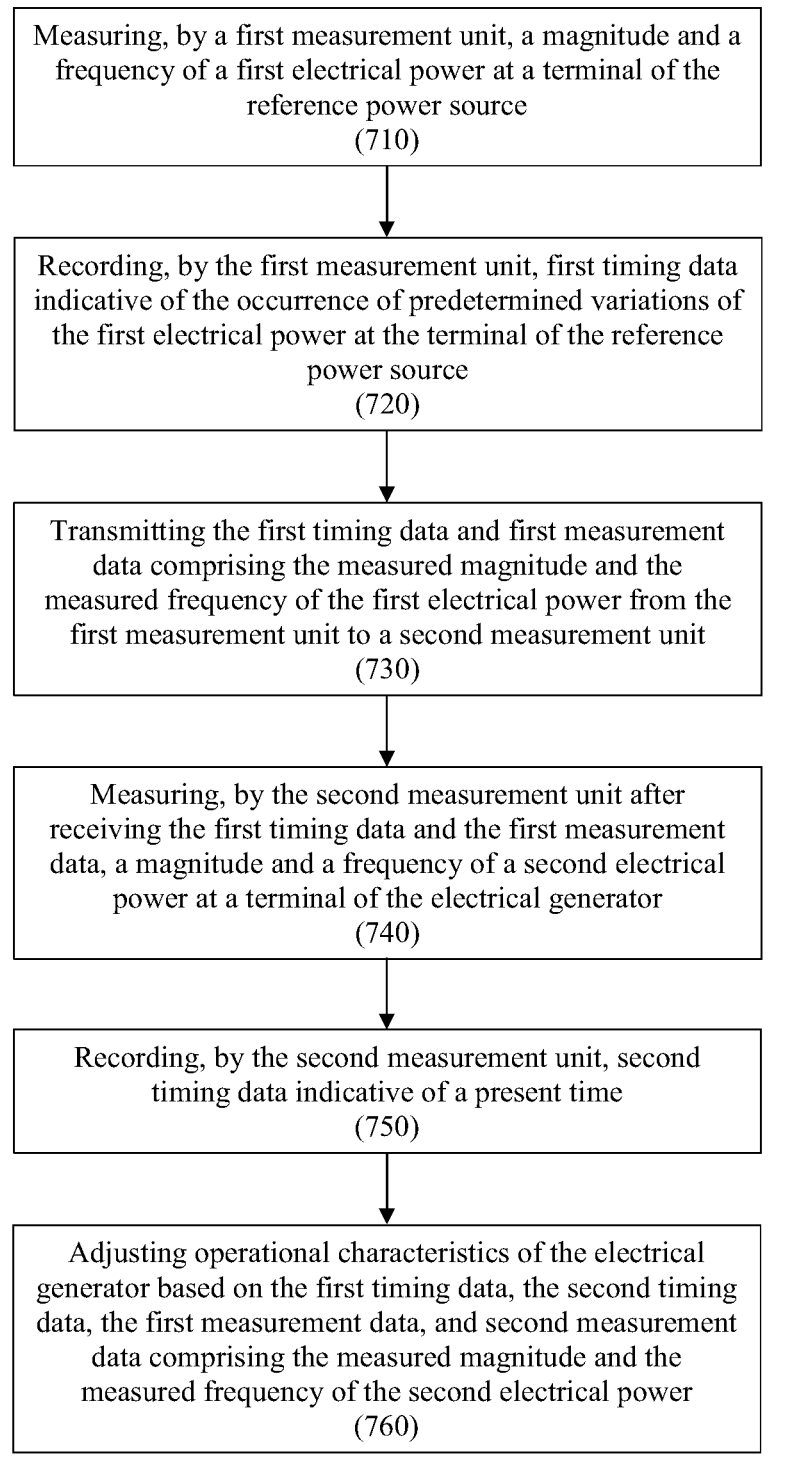
FIG. 7 illustrates another example method of synchronizing an electrical generator to a reference power source.

Referring to FIG. 7, there is illustrated another example method 700 for synchronizing an electrical generator to a reference power source. At step 710, the method comprises measuring, by a first measurement unit, a magnitude and a frequency of a first electrical power at a terminal of the reference power source. At step 720, the method comprises recording, by the first measurement unit, first timing data indicative of the occurrence of predetermined variations of the first electrical power at the terminal of the reference power source. Then, at step 730, the method comprises transmitting the first timing data and first measurement data comprising the measured magnitude and the measured frequency of the first electrical power from the first measurement unit to a second measurement unit. Then, at step 740, the method comprises measuring, by the second measurement unit after receiving the first timing data and the first measurement data, a magnitude and a frequency of a second electrical power at a terminal of the electrical generator. At step 750, the method comprises recording, by the second measurement unit, second timing data indicative of a present time. Then, at step 760, the method comprises adjusting operational characteristics of the electrical generator based on the first timing data, the second timing data, the first measurement data, and second measurement data comprising the measured magnitude and the measured frequency of the second electrical power.

In some examples, the first timing data and the second timing data are recorded using a common time reference or a common timing (or counter) signal, such as coordinated universal time (UTC). In some examples, the common time reference is a timing signal generated by a satellite system, such as the GPS.

In some examples, the first timing data and the first measurement data are transmitted from the first measurement unit to the second measurement unit through a wireless network or a wireless communication link.

In some examples, the predetermined variations of the first electrical power comprise a first zero crossing and a second zero crossing of the first electrical power, or of a fundamental waveform (e.g. a sinusoid) of the first electrical power. The first zero crossing and the second zero crossing may be consecutive (i.e. a rising zero crossing and a falling zero crossing separated by half of the period of the waveform) or non-consecutive (i.e. separated by an integer-multiple of half of the period of the waveform). In other examples, the predetermined variations may comprise a crest, a trough, or any other feature of the waveform, such as a specific slope of the waveform.

In some examples, step 760 comprises a first step of adjusting a present (or current) magnitude and a present (or current) frequency of the second electrical power based on the first measurement data and the second measurement data to align the present magnitude and the present frequency of the second electrical power with the measured magnitude and the measured frequency of the first electrical power. Step 760 further comprises a second step (which may be executed after the first step) of adjusting a present phase of the second electrical power to align the present phase of the second electrical power with a present phase of the first electrical power calculated using the first timing data and the second timing data.

In some examples, adjusting the present magnitude and the present frequency of the second electrical power comprises calculating a magnitude difference between the measured magnitude of the first electrical power and the measured magnitude of the second electrical power. Then, calculating a frequency difference between the measured frequency of the first electrical power and the measured frequency of the second electrical power. Then, generating an adjustment electrical signal based on the calculated magnitude difference and the calculated frequency difference. Then, supplying the adjustment electrical signal to the terminal of the electrical generator to align the present magnitude and the present frequency of the second electrical power with the measured magnitude and the measured frequency of the first electrical power.

In some examples, adjusting the present phase of the second electrical power comprises calculating the present phase of the first electrical power using the first timing data and the second timing data. Then, shifting the frequency of the second electrical power from a first frequency value to a second frequency value. Then, returning the frequency of the second electrical power from the second frequency value to the first frequency value after a time period based on the calculated present phase of the first electrical power.

In some examples, calculating the present phase of the first electrical power comprises calculating a period of the first electrical power from the first timing data. Then, calculating an amount of time elapsed between the present time of the second timing data and the recording of the first timing data. The time lapsed may account for latency of communication between the first measurement unit and the second measurement unit. Then, calculating the present phase using the calculated period and the calculated time lapsed. Calculating the present phase may comprise performing a modulus operation to calculate the remainder of a division of the time lapsed by the period. The present phase may then be provided by converting the remainder into radians (and adding or subtracting any predetermined phase amount to account for known, fixed delays or sine-cosine conversion).

In some examples, method 700 further comprises updating, by the first measurement unit and by the second measurement unit, measurements of the magnitude, frequency, and phase of the first electrical power and of the second electrical power. Then, determining whether a magnitude condition, a frequency condition, and a phase condition are satisfied. The magnitude condition is satisfied when a difference between the measured magnitude of the first electrical power and the measured magnitude of the second electrical power is less than a magnitude threshold. The frequency condition is satisfied when a difference between the measured frequency of the first electrical power and the frequency of the second electrical power is less than a frequency threshold. The phase condition is satisfied when a difference between the measured phase of the first electrical power and the measured phase of the second electrical power is less than a phase threshold. Then, if the magnitude condition, the frequency condition, and the phase condition are simultaneously satisfied for a predetermined time, method 700 may further comprise a step of controlling one or more switches to establish an electrical connection between the terminal of the electrical generator and the terminal of the reference power source.

In some examples, measuring the magnitude of the first electrical power comprises performing a fast Fourier transform of the first electrical power. Similarly, in some examples, measuring the magnitude of the second electrical power comprises performing a fast Fourier transform of the second electrical power.

In some examples, the electrical generator is a grid-forming inverter of a microgrid. In some examples, the reference power source is an electrical grid.

Therefore, in some examples, the system and method described above allow for dealing with latency in communication by using a combination of GPS timing and low bandwidth, low-cost communication technology. Moreover, in some examples, a method is provided by which the microgrid is moved back into synchronism with the main grid by controlling both voltage amplitude and frequency to within the threshold values, and then moving the phase of the microgrid to be coincident with the main grid. Once that is achieved, the switch between the microgrid and the main grid can safely be closed. In some examples, following resynchronization process, a grid forming inverter of the microgrid is reconfigured to a grid feeding system. The microgrid is then able to follow the main grid as was the case prior to the disconnection.

The resynchronization process may be described as a process of controlling the operation of the microgrid so that its voltage phasor becomes coincident with the voltage phasor of the main grid. However, if the microgrid's voltage phasor is moved too quickly (i.e. if the amplitude, frequency, or phase of the power is adjusted too rapidly), there may be a risk of destabilizing the microgrid through load tripping or source disconnection. Therefore, in some examples, the system and method described above ensure that the control of the second electrical power does not cause changes that are too fast so as to avoid tripping the protection on loads or generation.

Example Synchronization System

Referring to FIGS. 8 to 11, there is illustrated an example first electrical enclosure (or box) 910 and an example second electrical enclosure (or box) 920 forming at least part of a system for synchronizing a grid-forming inverter to a main grid. First electrical enclosure 910 is used on the main grid side of the synchronization system for monitoring voltage information of the mains which will be transmitted wirelessly. Second electrical enclosure 920 acts as the master controller of the grid forming inverter on the micro-grid side of the synchronization system, receiving data from the main grid and sending commands to the inverters.

Figure 10:
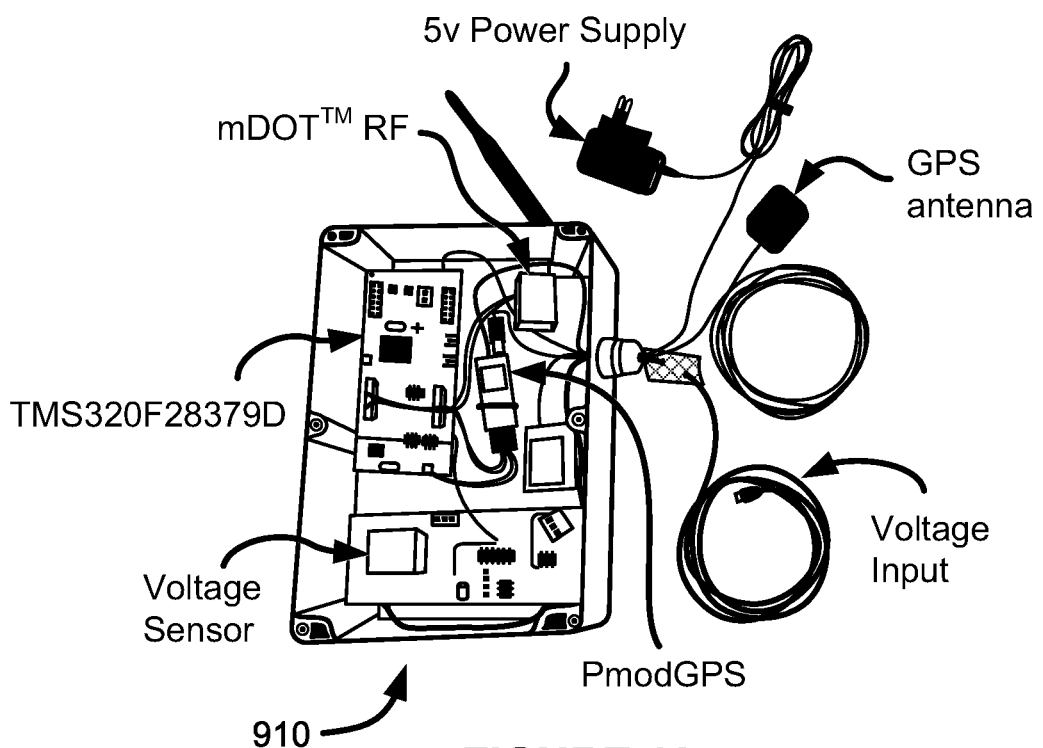
FIG. 10 illustrates a view of the internal components of the first electrical enclosure of FIG. 8.
Figure 11:
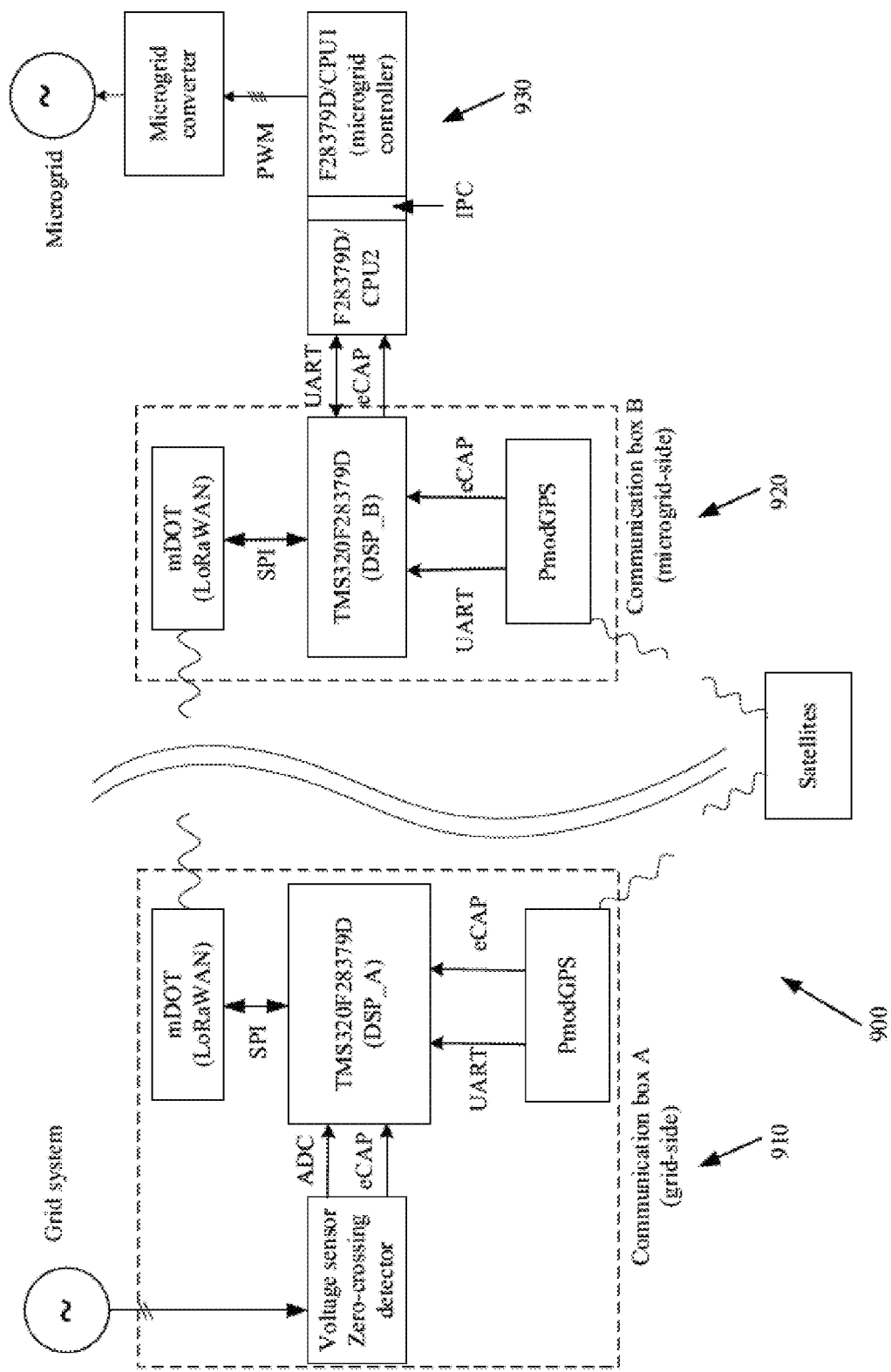
FIG. 11 illustrates a block schematic of a system for synchronizing an inverter of a microgrid to an electrical grid, including the first and second electrical enclosures of FIG. 8.

Each of electrical enclosures 910 and 920 comprises a GPS receiver (PmodGPS™), a radio frequency transceiver (Multiconnect® mDOT™ RF module), and a microcontroller (Texas Instruments® TMS320F28379D Launch-Pad™). As shown in FIG. 10, electrical enclosure 910 further comprises a voltage sensor. The radio frequency transceiver may implement long range wide-area network (LoRaWAN) technology.

The key IC chips can be accommodated in one printed circuit board (PCB) to keep costs low. Additionally, the power consumption of the electrical enclosures 910 and 920 is less than 3 W, which means both boxes can be powered by small scale PV panels.

Electrical enclosure 910 is configured to monitor the following information of the mains (three-phase): voltage RMS value; voltage frequency; phase angle; magnitude of odd order harmonics, in some examples up to the eleventh harmonic; and phase number.

In some examples, a LEM voltage sensor (may be a transformer) scales the mains voltage down to between 0 and 3 V so that the voltage can be sampled by an ADC channel of the microcontroller. A comparator circuit is used for zero-crossing detection and interrupts the microcontroller by an eCAP channel.

The boxes use Coordinated Universal Time (UTC) integrated in GPS signals provided by the PmodGPS module to minimize the delay caused by wireless transmission.

The data package including voltage information and time stamp is transmitted from the LoRaWAN module of enclosure 910 and then received by the LoRaWAN module in enclosure 920, whose microcontroller subsequently unpacks the data, combines the UTC from the PmodGPS module and transfers them to the CPU2 of the microgrid controller 930 via UART channel.

The CPU2 of microgrid-controller 930 processes the received data from enclosure 920 and decodes the present time to the phase angle of the grid-voltage to compensate for the delay of the communication channel. The CPU2 writes the update phase angle, RMS value, and the connection state of the two communication boxes to the interprocessor communication (IPC) registers, which are available for CPU1 to read.

Once provided with GPS signals, LoRaWAN technology can take advantage of the UTC element to synchronize the target signal on multiple sides with a minimum delay algorithm. Thus, it may provide a solution for the power system industry to time-critical challenges which require timing accuracy within tens of micro-seconds. Due to its intrinsic low-power feature, this technology may require minimum maintenance and power supply if integrated with PV panels and batteries, perfectly suitable for outback/outdoor applications.

The use of an advanced DSP processor with dual cores (e.g. TMS320F28379D from Texas Instruments®) may ease the burden of running the control algorithm in conjunction with ADC sampling. While the main core (CPU1) is executing the complicated algorithm, the secondary core (CPU2) is responsible for communicating with other modules (like GPS and LoRaWAN), unpacking the received data and reconstructing the phase angle. CPU1 only needs to read the data from the interprocessor communication (IPC) mechanism. Since the phase angle has been aligned with UTC, the error of reconstruction is minimized to the delay of CPU1 servicing an interrupt which can be easily compensated.

Moreover, the advanced DSP has another feature named Control Law Accelerator (CLA) which facilitates processing data from peripherals in parallel with CPUs. This may further reduce the computational burden on CPUs and minimize errors between the re-constructed phase angle and that of the mains voltage.

Therefore, in synchronization system 900, communication may occur between electrical enclosure 910 and electrical enclosure 920, and between electrical enclosure 920 and microgrid controller 930. The data are transferred from DSP_A to the mDOT module in electrical enclosure 910 via SPI once per second. Then the data are wirelessly transferred through LoRaWAN from the mDOT module in electrical enclosure 910 to that in electrical enclosure 920, which delivers the data to the DSP_B via SPI. An example data package format from DSP_A to DSP_B (SPI-LoRaWAN-SPI) is illustrated in FIG. 12.

The DSP_B checks that the received package has the correct sender ID and length, and then reads the UTC value from the PmodGPS to the data package before transferring to the CPU2 of microgrid controller 930. An example data package format from DSP_B to CPU2 (UART) is illustrated in FIG. 13.

In the example data packages of FIGS. 12 and 13, "[" represents a start byte indicator; "rev" is reserved for future use; "len" represents the length of the package; "Addr-A/B" represents an identification of the sender; "Zrcr" represents a zero-crossing point (in UTC); "Period" represents the fundamental period of the grid voltage; "RMS" represents the RMS value of the grid voltage; "UTC" represents the UTC value read by DSP_B; "State" represents a state of the connection (bits [0-3]=0xF is valid data, 12 reserved bits for future use); and "]" represents an end byte indicator.

Figure 14:
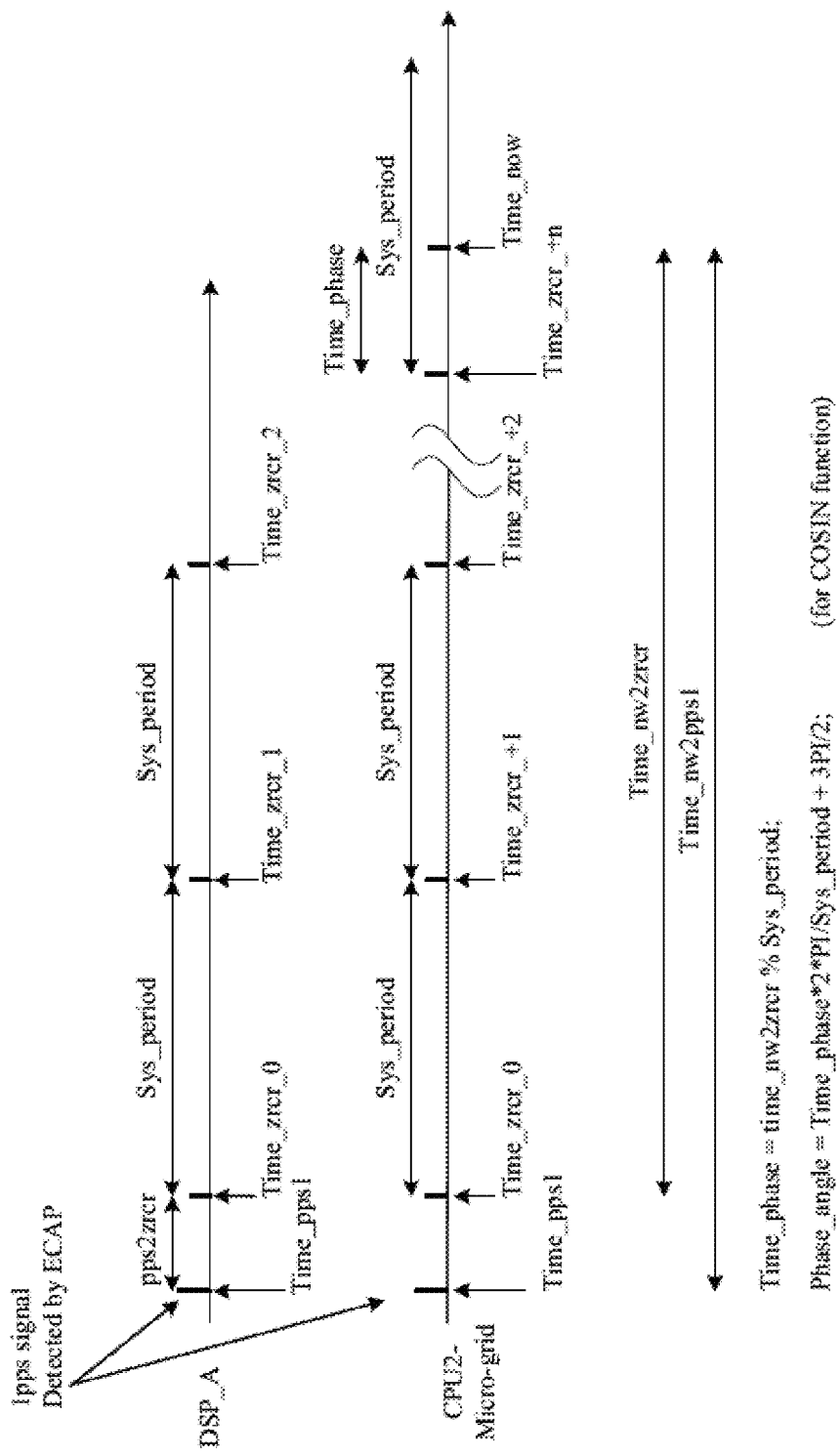
FIG. 14 illustrates an example timeline showing the process for calculating the present phase angle of a grid voltage using a past zero-crossing time.

In this way, CPU2 of the microgrid controller 930 receives the zero-crossing time and fundamental period of the grid voltage from electrical enclosure 910 and the UTC from the PmodGPS module at electrical enclosure 920. By using its internal timer counter in micro-seconds, CPU2 is able to recover the phase angle of the grid voltage. FIG. 14 illustrates the phase-angle calculation process. An amount of $3\pi/2$ is added to the calculated phase angle due to the cosine function of the voltage regulation.

Figure 15:
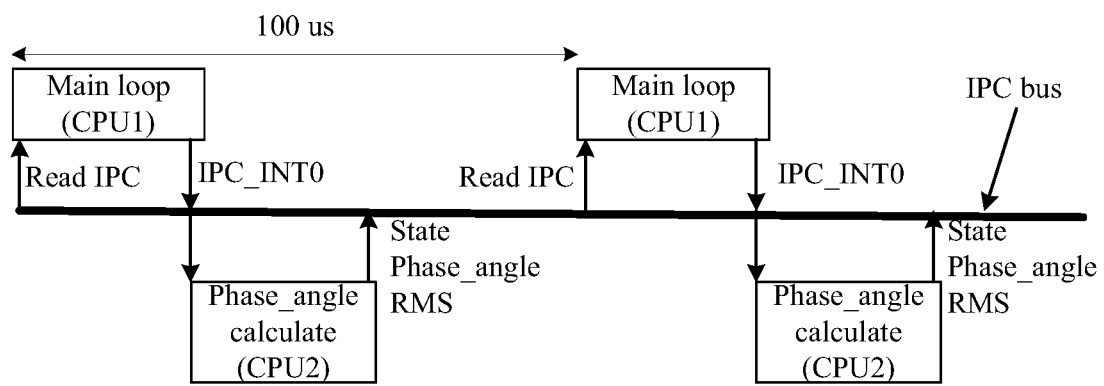
FIG. 15 illustrates an example timeline showing communication between a first microprocessor and a second microprocessor of a microgrid controller of the system of FIG. 8.
Figure 16:
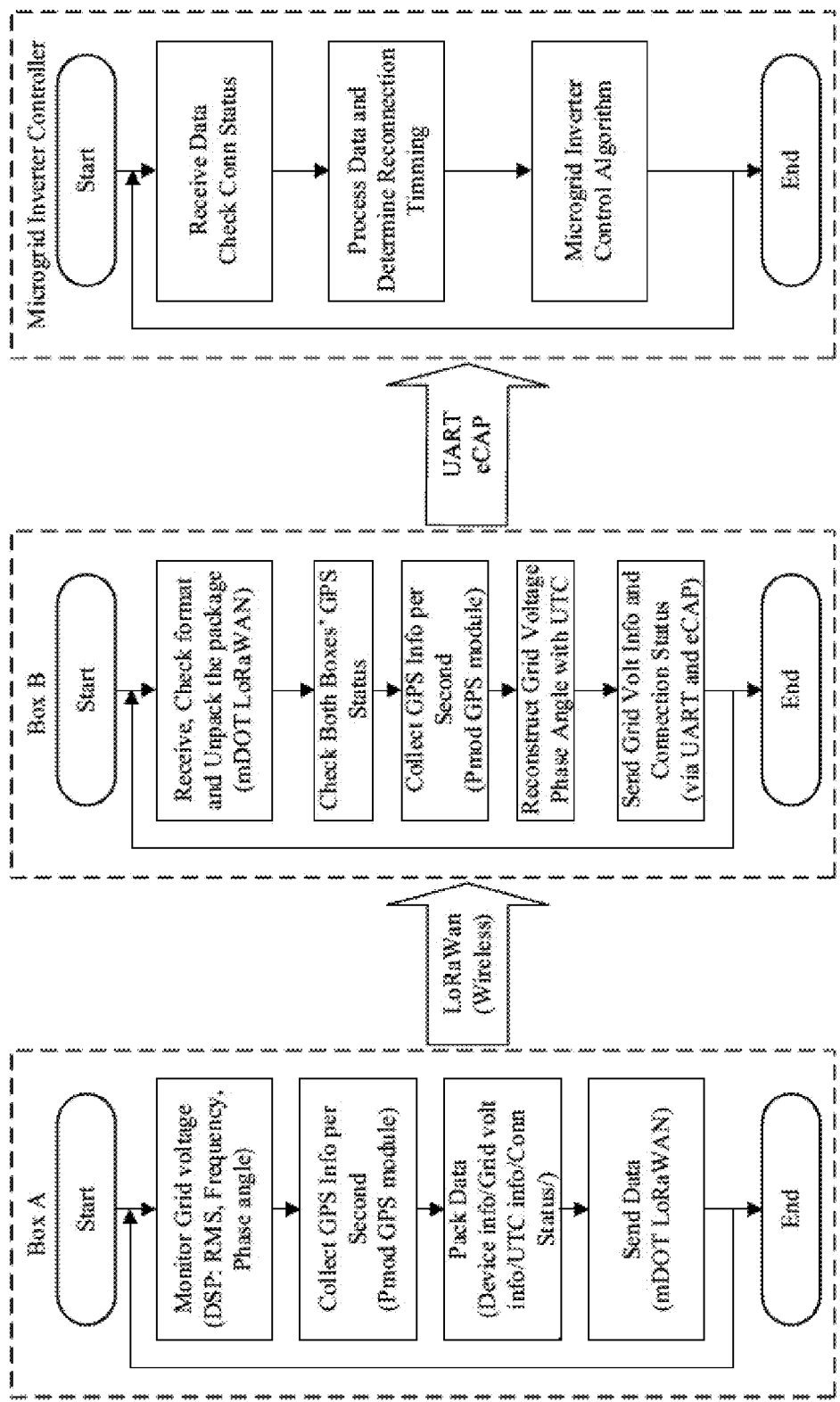
FIG. 16 illustrates flowcharts of example processes of operation of a first electrical enclosure, a second electrical enclosure, and a microgrid controller of the system of FIG. 8.

The main loop on microgrid controller 930 is 10 kHz. During the control loop, CPU1 sends an interrupt to CPU2 to request the update data of the grid voltage. The CPU2 calculates the phase angle of the grid voltage in advance of 100 us, which are available for the CPU1 in the next control loop as shown in FIG. 15. The operation of electrical enclosure 910 (i.e. Box A), electrical enclosure 920 (i.e. Box B), and microgrid controller 930 is summarized in FIG. 16.

Figure 17:
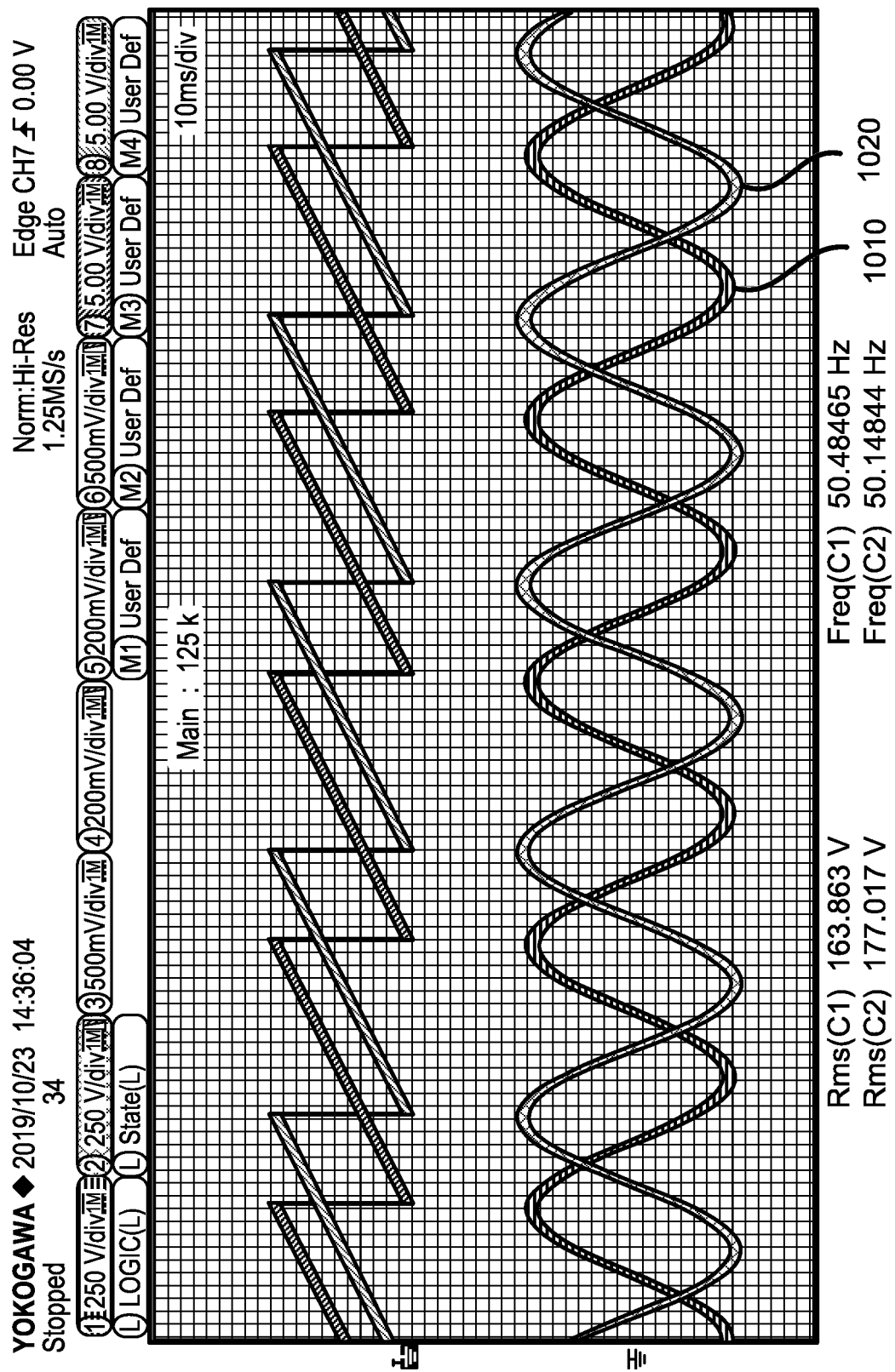
FIG. 17 illustrates an example plot of voltage and phase of a microgrid power and of a grid power before synchronization.
Figure 18:
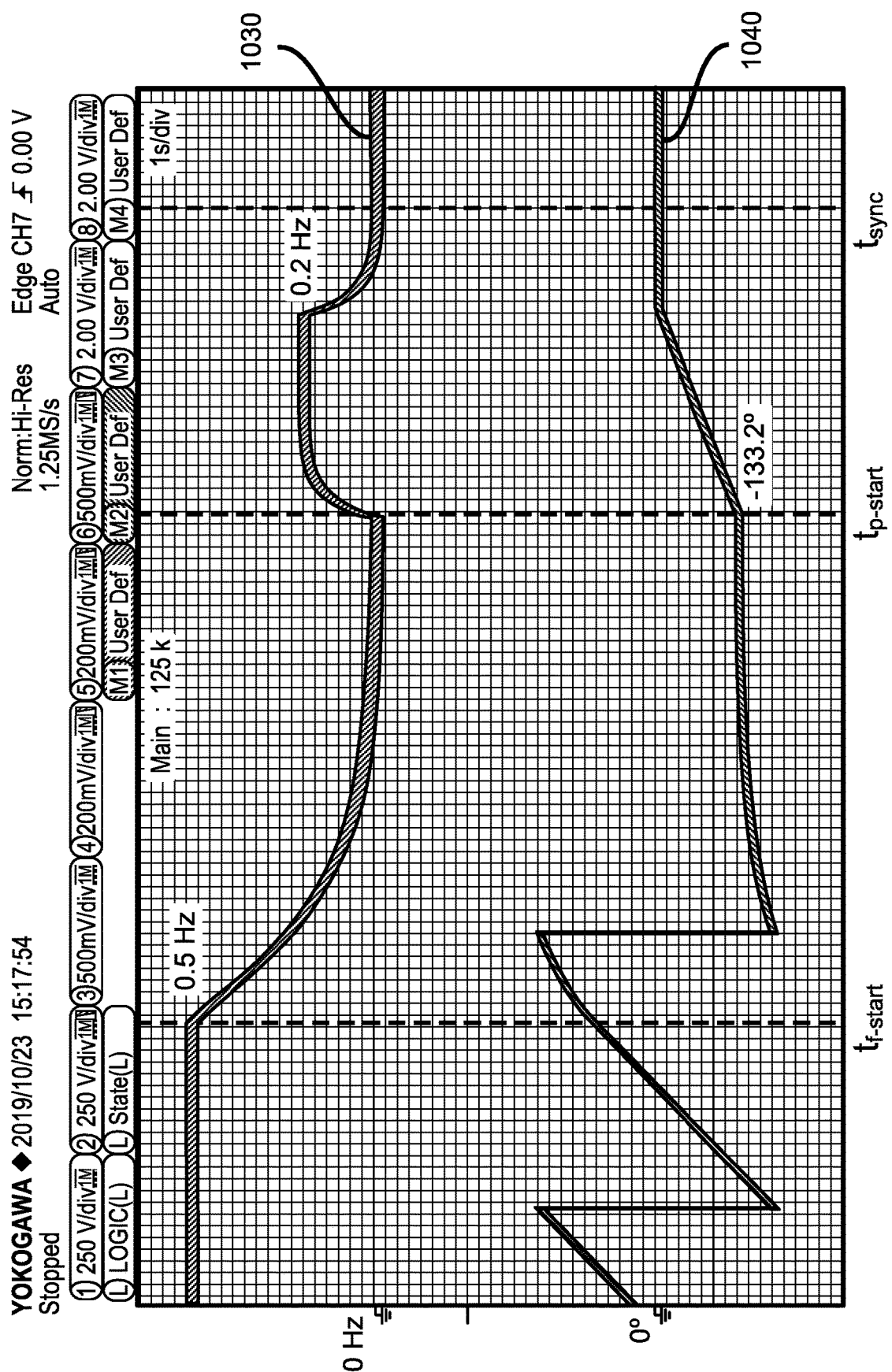
FIG. 18 illustrates an example plot of a frequency difference and a phase difference of a microgrid power and a grid power before, during, and after synchronization.
Figure 19:
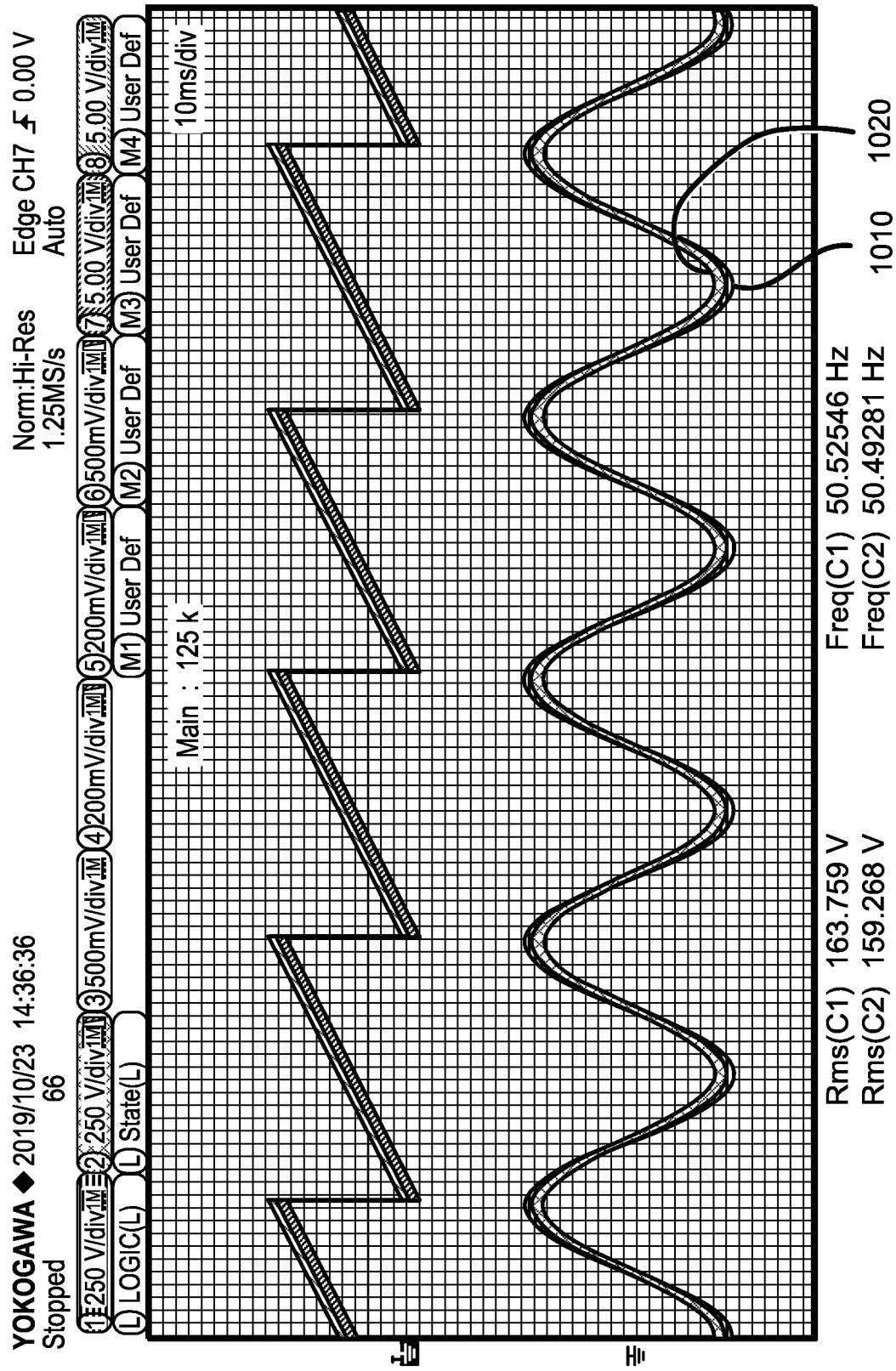
FIG. 19 illustrates an example plot of voltage and phase of a microgrid power and of a grid power following synchronization.

FIGS. 17 to 19 illustrate example measurements of the electrical power of a microgrid and the electrical power of an electrical grid during a resynchronization process.

Referring to FIG. 17, prior to the resynchronization process, the grid power 1010 has a frequency of 50.5 Hz and an RMS voltage of 160 V, while the microgrid power 1020 has a frequency of 50 Hz and an RMS voltage of 180 V.

Referring to FIG. 18, which shows the difference in frequency 1030 and the difference in phase 1040 between the grid power and the microgrid power, regulation of the frequency and voltage amplitude begin at $t_{f\_start}$ and end at $t_{p\_start}$. During this period, the frequency error reduces to within the range of ±0.02 Hz and the phase angle error becomes a constant.

Next, at $t_{p\_start}$, the phase compensation starts by adding a 0.2 Hz frequency offset in the inverter control. When the phase error reduces to an acceptable range (±5°), the frequency offset is removed. The synchronization process is complete at $t_{sync}$. The grid power 1010 and microgrid power 1020 after synchronization are plotted in FIG. 19.

Figure 20:
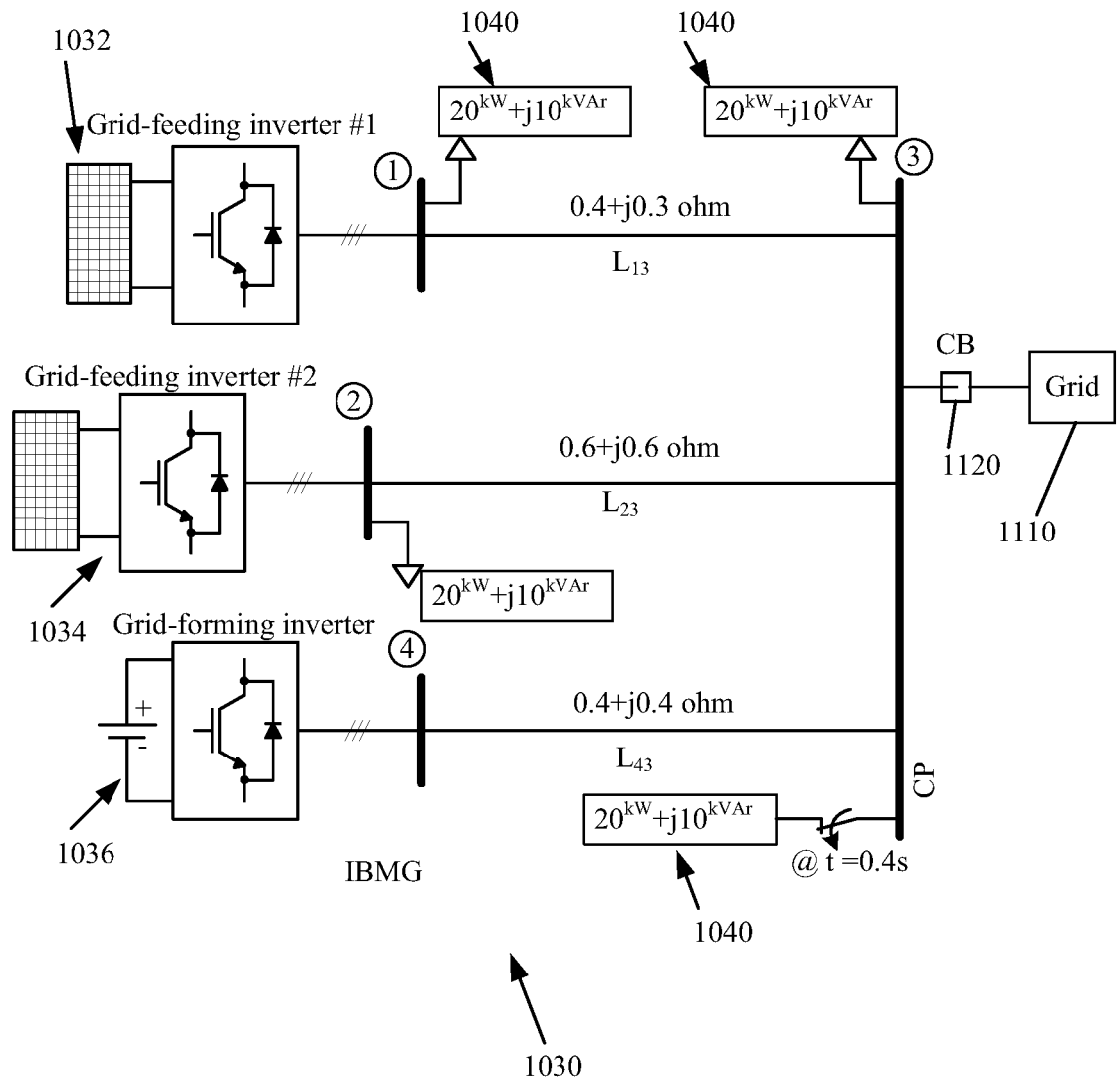
FIG. 20 illustrates a single-line diagram of an example simulation of a synchronization system.

Referring to FIG. 20, there is illustrated a single-line diagram of an example simulation of a synchronization system comprising a model of a main grid 1110 connected, through a circuit breaker 1120, to a model of a microgrid 1130. Microgrid 1130 comprises a first grid-feeding inverter 1132, a second grid-feeding inverter 1134, and a grid-forming inverter 1136. Inverters 1132, 1134, and 1136 provide energy into microgrid 1130. Electrical loads 1140 are connected to the inverters of microgrid 1130. In the simulation of FIG. 20, a load 1140 becomes connected to microgrid 1130 at a simulation time of 0.4 seconds in order to model the response of microgrid 1130. The simulation model illustrated in FIG. 20 may be used to model the process of resynchronization in any simulation or computing environment. For example, the model may be used to model the process or resynchronization in MATLAB™, followed by PSCAD™, and ultimately in the language used by the real-time digital simulation platform.

Figure 8:
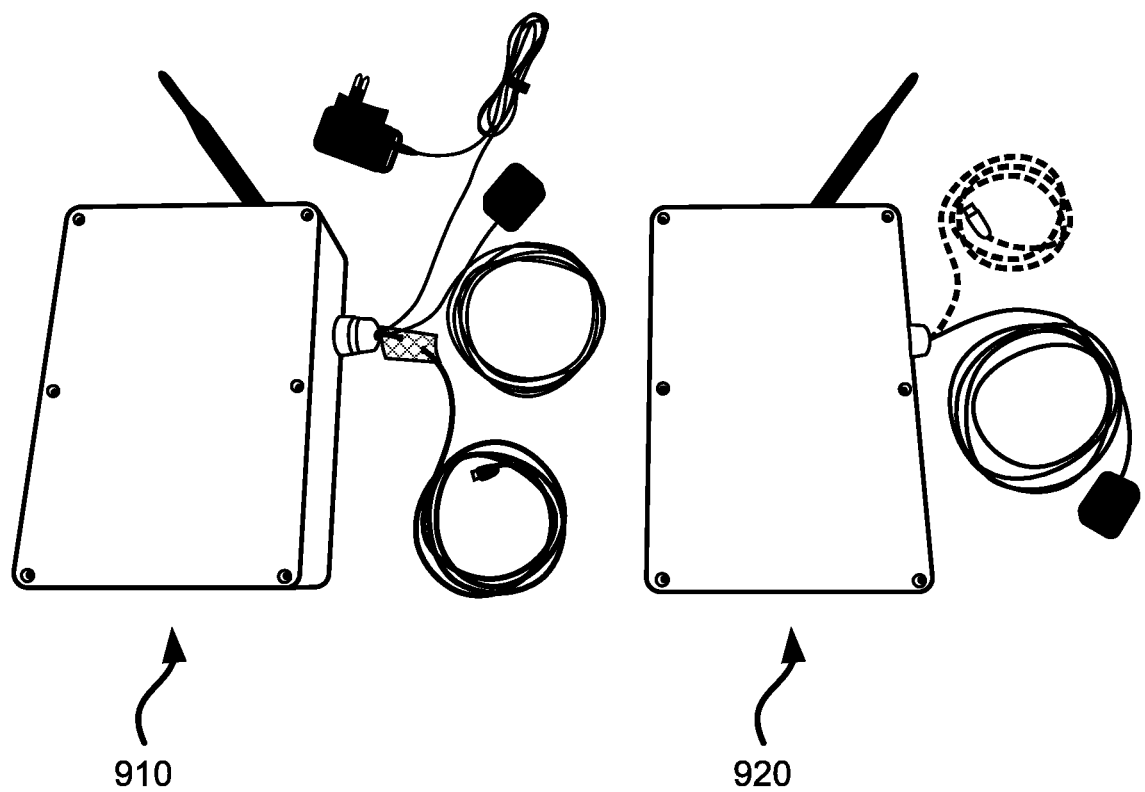
FIG. 8 illustrates a top view of example first and second electrical enclosures of a system for synchronizing an inverter of a microgrid to an electrical grid.
Figure 9:
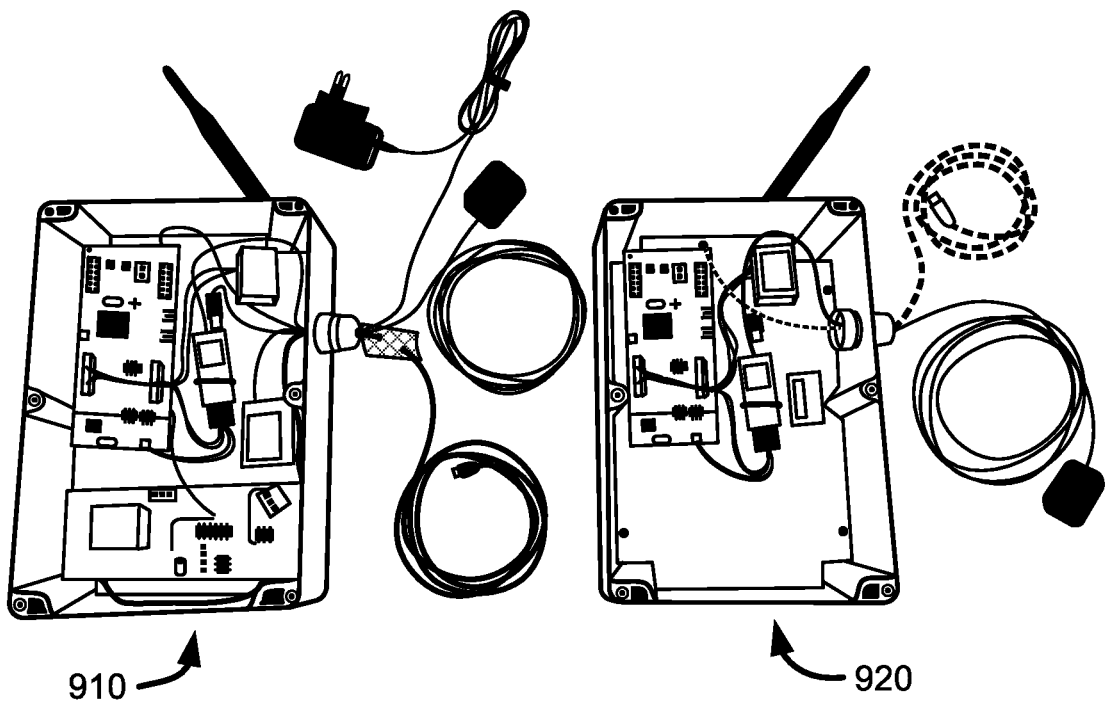
FIG. 9 illustrates a top view of the electrical enclosures of FIG. 8, with internal components of the system exposed.
Figure 21:
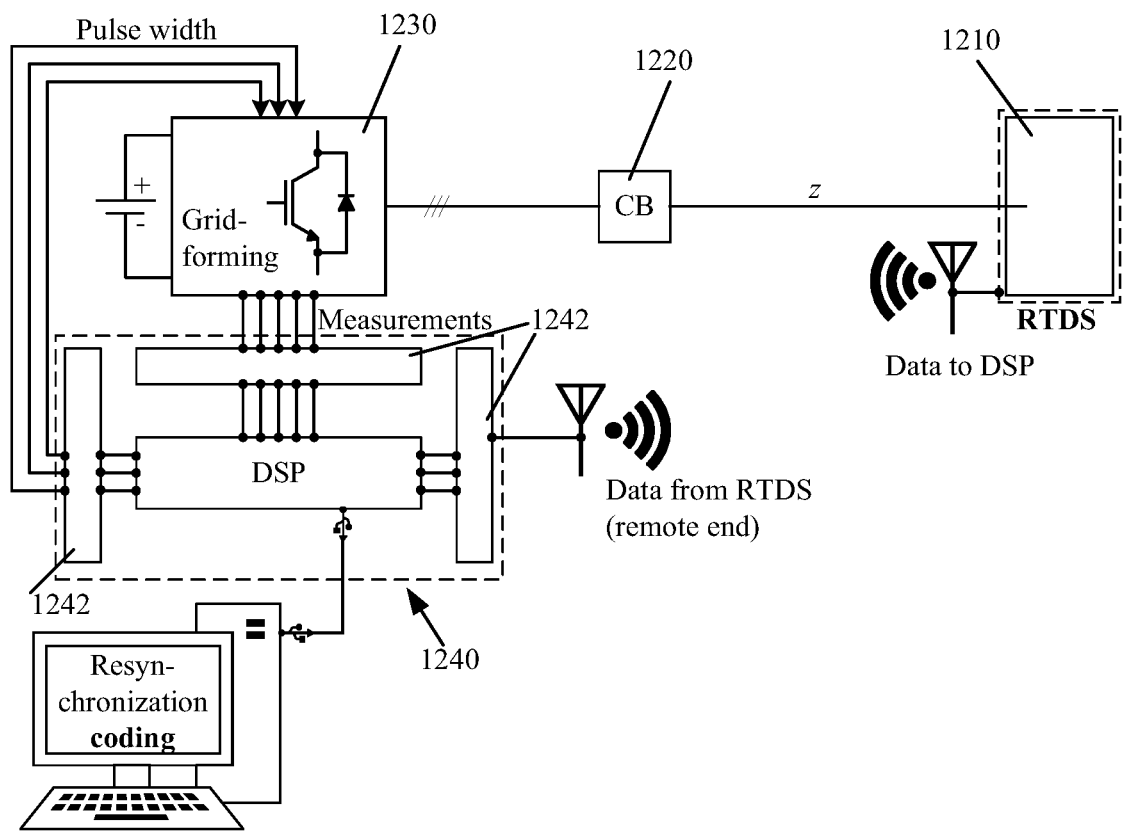
FIG. 21 illustrates a schematic of an example experimental setup for testing a synchronization system.
Figure 22:
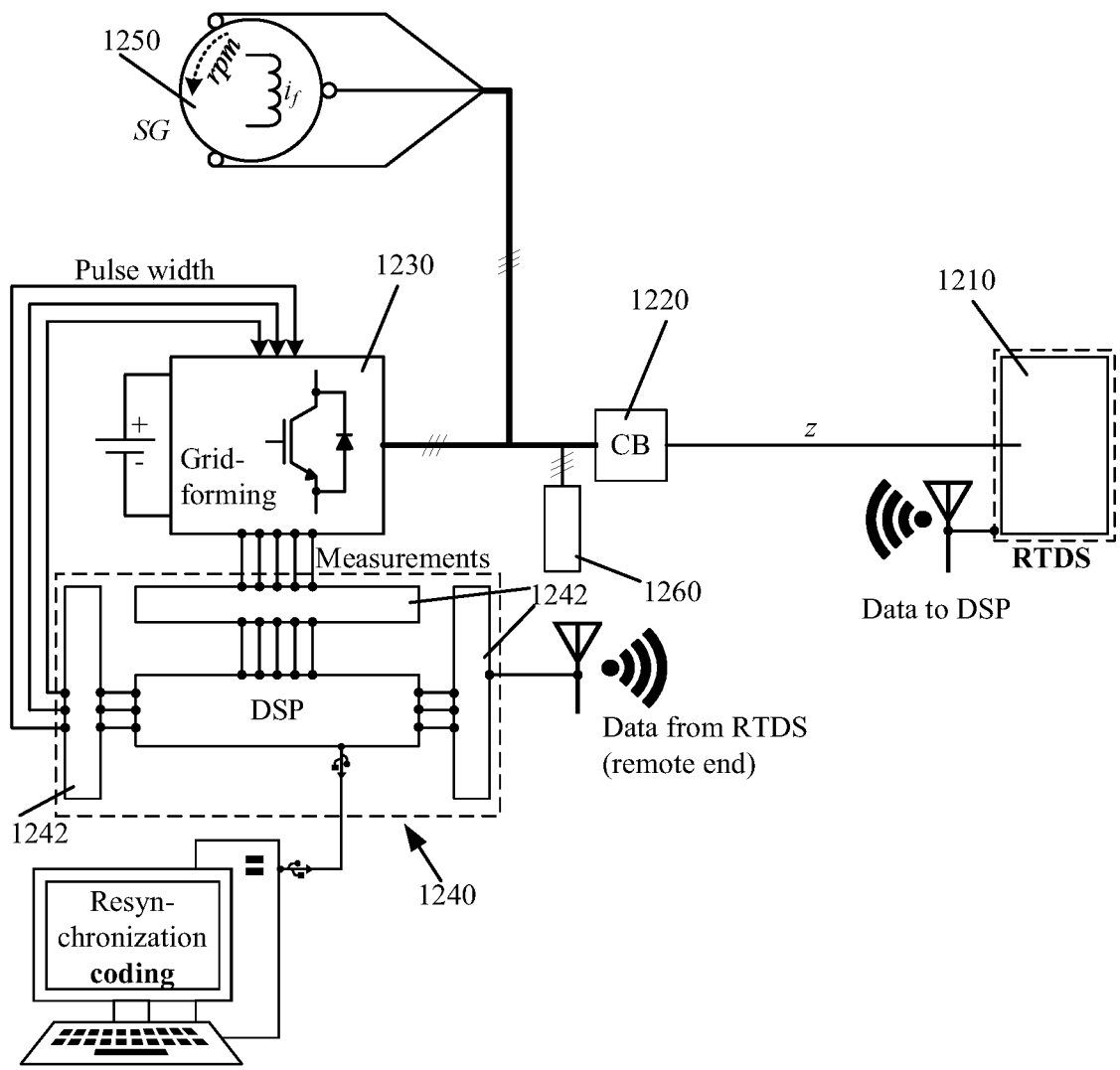
FIG. 22 illustrates a schematic of another example experimental setup for testing a synchronization system.
Figure 23:
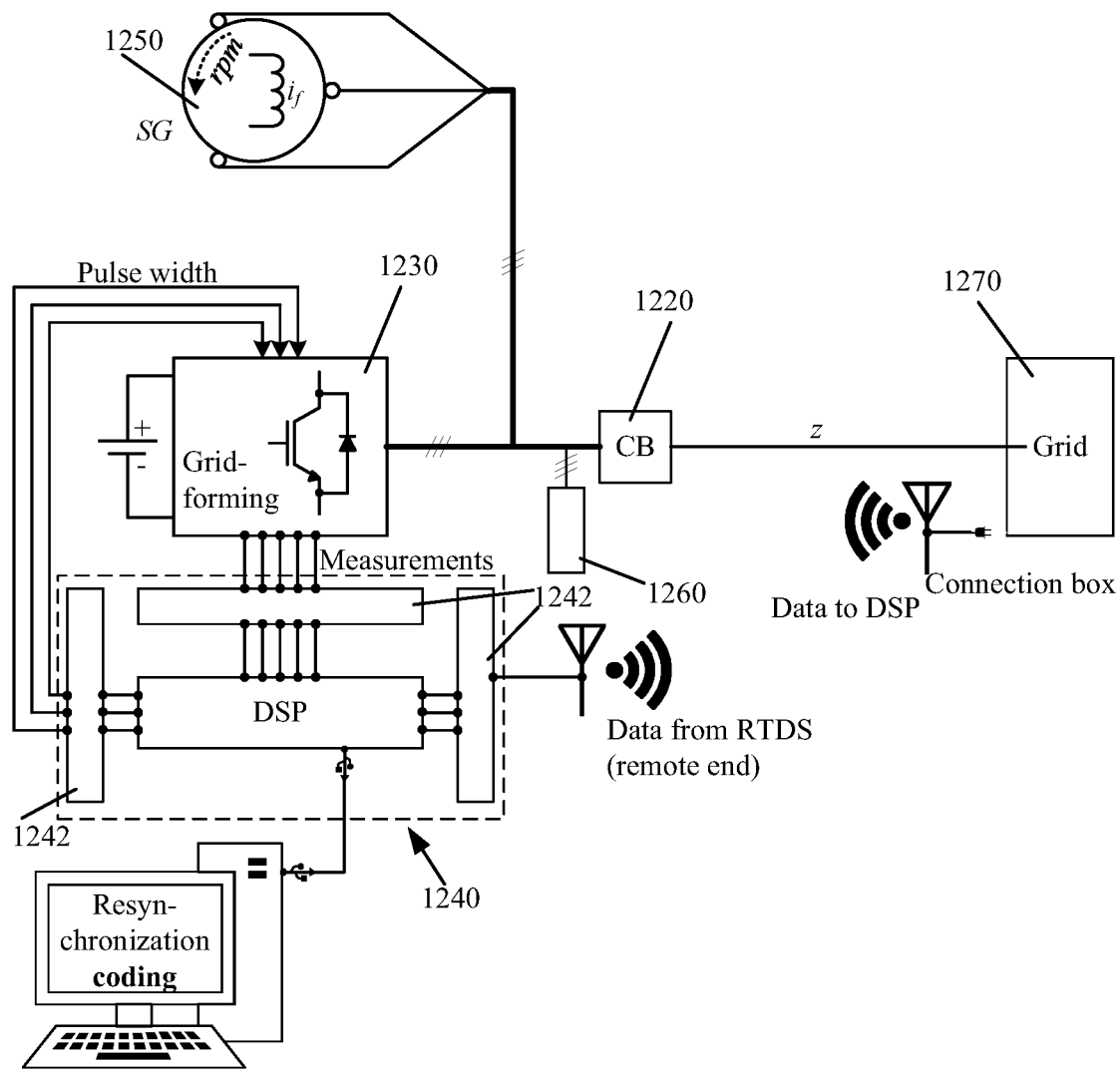
FIG. 23 illustrates a schematic of another example experimental setup for testing a synchronization system.

Referring to FIGS. 21 to 23, there are illustrated example experimental setups for testing a synchronization system, such as the synchronization system of FIGS. 8 to 10.

The experimental setup of FIG. 21 is for first stage testing and comprises a real-time digital simulator (RTDS) 1210 providing, which models a main grid. RTDS 1210 is connected, through a circuit breaker 1220, to a grid-forming inverter 1230. The setup also includes a measurement unit 1240 coupled to grid-forming inverter 1230. RTDS 1210 is in data communication with measurement unit 1240. Measurement unit 1240 comprises interface boards 1242, which are electronic subsystems that interface a communications receiver, to measurements of voltage and current from grid-forming inverter 1230, and to pulse width modulation (PWM) signals generated by the DSP of measurement unit 1240 to the inverter gate drivers. In some examples, measurement unit 1240 corresponds to second electrical enclosure 920 of FIGS. 8 and 9. In some examples, first electrical enclosure 910 of FIGS. 8 and 9 is connected to RTDS 1210.

The experimental setup of FIG. 22 is for second stage testing. The setup is similar to that of FIG. 21, but also includes a rotational (or synchronous) generator 1250 and a load 1260 electrically connected to grid-forming inverter 1230. The setup of FIG. 22 may be used to test whether the synchronization system is able to cope with a wide range of load types and generator interfaces.

The experimental setup of FIG. 23 is for third stage testing. The setup is similar to that of FIG. 22, but the RTDS is replaced by an actual grid 1270 so that grid-forming inverter 1230 is selectively connected to main grid 1270 through circuit breaker 1220.

Optional embodiments may also be said to broadly include the parts, elements, steps and/or features referred to or indicated herein, individually or in any combination of two or more of the parts, elements, steps and/or features, and wherein specific integers are mentioned which have known equivalents in the art to which the invention relates, such known equivalents are deemed to be incorporated herein as if individually set forth.

Although a preferred embodiment has been described in detail, it should be understood that many modifications, changes, substitutions or alterations will be apparent to those skilled in the art without departing from the scope of the present invention.

Throughout this specification and the claims which follow, unless the context requires otherwise, the word "comprise", and variations such as "comprises" or "comprising", will be understood to imply the inclusion of a stated integer or step or group of integers or steps but not the exclusion of any other integer or step or group of integers or steps.

The invention claimed is:

1. A system for synchronizing an electrical generator to a reference power source, the system comprising:
a first measurement unit configured to:
measure a magnitude and a frequency of a first electrical power at a terminal of the reference power source;
record first timing data indicative of the occurrence of predetermined variations of the first electrical power at the terminal of the reference power source; and
transmit the first timing data and first measurement data comprising the measured magnitude and the measured frequency of the first electrical power;
a second measurement unit configured to:
receive the first measurement data;
measure a magnitude and a frequency of a second electrical power at a terminal of the electrical generator; and
record second timing data indicative of a present time; and
a controller configured to:
adjust operational characteristics of the electrical generator based on the first timing data, the second timing data, the first measurement data, and second measurement data comprising the measured magnitude and the measured frequency of the second electrical power,
adjust operational characteristics of the electrical generator by adjusting the phase of the second electrical power to align with the phase of the first electrical power using the first timing data and the second timing data, and
adjust the phase of the second electrical power by:
calculating a present phase of the first electrical power using the first timing data and the second timing data;
shifting the frequency of the second electrical power from a first frequency value to a second frequency value; and
returning the frequency of the second electrical power from the second frequency value to the first frequency value after a time period based on the calculated present phase of the first electrical power.

2. The system of claim 1, wherein the first timing data and the second timing data are recorded using a common time reference.

3. The system of claim 2, wherein the common time reference is a timing signal generated by a satellite system, and wherein each of the first measurement unit and the second measurement unit comprises a satellite receiver for receiving the timing signal from the satellite system.

4. The system of claim 1, wherein each of the first measurement unit and the second measurement unit is connected to a wireless network, and wherein the first measurement unit is configured to transmit the first timing data and the first measurement data to the second measurement unit through the wireless network.

5. The system of claim 1, wherein the predetermined variations of the first electrical power comprise a first zero crossing and a second zero crossing of the first electrical power.

6. The system of claim 1, wherein the controller is configured to adjust operational characteristics of the electrical generator by adjusting the magnitude and the frequency of the second electrical power to align with the magnitude and the frequency of the first electrical power using the first measurement data and the second measurement data.

7. The system of claim 6, wherein the controller is configured to adjust the magnitude and the frequency of the second electrical power by:
- calculating a magnitude difference between the measured magnitude of the first electrical power and the measured magnitude of the second electrical power;
- calculating a frequency difference between the measured frequency of the first electrical power and the measured frequency of the second electrical power;
- generating an adjustment electrical signal based on the calculated magnitude difference and the calculated frequency difference; and
- supplying the adjustment electrical signal to the terminal of the electrical generator to align the magnitude and the frequency of the second electrical power with the measured magnitude and the measured frequency of the first electrical power.

8. The system of claim 1, wherein the controller is configured to calculate the present phase of the first electrical power by:
- calculating a period of the first electrical power from the first timing data;
- calculating time lapsed between the present time of the second timing data and the recording of the first timing; and
- calculating the present phase using the calculated period and the calculated time lapsed.

9. The system of claim 1, further comprising a comparator configured to:
- determine whether a magnitude condition is satisfied by checking if a difference between the magnitude of the first electrical power and the magnitude of the second electrical power is less than a magnitude threshold;
- determine whether a frequency condition is satisfied by checking if a difference between the frequency of the first electrical power and the frequency of the second electrical power is less than a frequency threshold;
- determine whether a phase condition is satisfied by checking if a difference between the phase of the first electrical power and the phase of the second electrical power is less than a phase threshold; and
- if the magnitude condition, the frequency condition, and the phase condition are satisfied for a predetermined time, controlling one or more switches to establish an electrical connection between the terminal of the electrical generator and the terminal of the reference power source.

10. The system of claim 1, wherein the first measurement unit comprises a processing system configured to measure the magnitude of the first electrical power by performing a fast Fourier transform of the first electrical power, and wherein the second measurement unit comprises a processing system configured to measure the magnitude of the second electrical power by performing a fast Fourier transform of the second electrical power.

11. The system of claim 1, wherein the first measurement unit comprises a phase-locked loop configured to measure the frequency of the first electrical power, and wherein the second measurement unit comprises a phase-locked loop configured to measure the frequency of the second electrical power.

12. The system of claim 1, wherein the electrical generator is a grid-forming inverter of a microgrid, and wherein the reference power source is an electrical grid.

13. A method for synchronizing an electrical generator to an reference power source, the method comprising:
- measuring, by a first measurement unit, a magnitude and a frequency of a first electrical power at a terminal of the reference power source;
- recording, by the first measurement unit, first timing data indicative of the occurrence of predetermined variations of the first electrical power at the terminal of the reference power source;
- transmitting the first timing data and first measurement data comprising the measured magnitude and the measured frequency of the first electrical power from the first measurement unit to a second measurement unit;
- measuring, by the second measurement unit after receiving the first timing data and the first measurement data, a magnitude and a frequency of a second electrical power at a terminal of the electrical generator;
- recording, by the second measurement unit, second timing data indicative of a present time; and
- adjusting operational characteristics of the electrical generator based on the first timing data, the second timing data, the first measurement data, and second measurement data comprising the measured magnitude and the measured frequency of the second electrical power, wherein adjusting operational characteristics of the electrical generator comprises:
  - adjusting a present magnitude and a present frequency of the second electrical power based on the first measurement data and the second measurement data to align the present magnitude and the present frequency of the second electrical power with the measured magnitude and the measured frequency of the first electrical power,
  - adjusting a present phase of the second electrical power to align the present phase of the second electrical power with a present phase of the first electrical power calculated using the first timing data and the second timing data, and
- wherein adjusting the present phase of the second electrical power comprises:
  - calculating the present phase of the first electrical power using the first timing data and the second timing data,
  - shifting the frequency of the second electrical power from a first frequency value to a second frequency value, and
  - returning the frequency of the second electrical power from the second frequency value to the first frequency value after a time period based on the calculated present phase of the first electrical power.

14. The method of claim 13, wherein the first timing data and the second timing data are recorded using a common time reference.

15. The method of claim 14, wherein the common time reference is a timing signal generated by a satellite system.

16. The method of claim 13, wherein the first timing data and the first measurement data are transmitted from the first measurement unit to the second measurement unit through a wireless network.

17. The method of claim 13, wherein the predetermined variations of the first electrical power comprise a first zero crossing and a second zero crossing of the first electrical power.

18. The method of claim 13, wherein adjusting the present magnitude and the present frequency of the second electrical power comprises:
- calculating a magnitude difference between the measured magnitude of the first electrical power and the measured magnitude of the second electrical power;

calculating a frequency difference between the measured frequency of the first electrical power and the measured frequency of the second electrical power;

generating an adjustment electrical signal based on the calculated magnitude difference and the calculated frequency difference; and supplying the adjustment electrical signal to the terminal of the electrical generator to align the present magnitude and the present frequency of the second electrical power with the measured magnitude and the measured frequency of the first electrical power.

19. The method of claim 13, wherein calculating the present phase of the first electrical power comprises:

calculating a period of the first electrical power from the first timing data;

calculating time lapsed between the present time of the second timing data and the recording of the first timing; and calculating the present phase using the calculated period and the calculated time lapsed.

20. The method of claim 13, further comprising:

updating, by the first measurement unit and by the second measurement unit, measurements of the magnitude, frequency, and phase of the first electrical power and of the second electrical power;

determining whether a magnitude condition is satisfied by checking if a difference between the measured magnitude of the first electrical power and the measured magnitude of the second electrical power is less than a magnitude threshold;

determine whether a frequency condition is satisfied by checking if a difference between the measured frequency of the first electrical power and the frequency of the second electrical power is less than a frequency threshold;

determine whether a phase condition is satisfied by checking if a difference between the measured phase of the first electrical power and the measured phase of the second electrical power is less than a phase threshold; and if the magnitude condition, the frequency condition, and the phase condition are satisfied for a predetermined time, controlling one or more switches to establish an electrical connection between the terminal of the electrical generator and the terminal of the reference power source.

21. The method of claim 13, wherein measuring the magnitude of the first electrical power comprises performing a fast Fourier transform of the first electrical power, and wherein measuring the magnitude of the second electrical power comprises performing a fast Fourier transform of the second electrical power.

22. The method of claim 13, wherein the electrical generator is a grid-forming inverter of a microgrid, and wherein the reference power source is an electrical grid.

* * * * *